US012562151B1

(12) United States Patent
Kulshreshtha et al.

(10) Patent No.: US 12,562,151 B1
(45) Date of Patent: Feb. 24, 2026

(54) AUGMENTING AUTOMATED SPEECH RECOGNITION NEURAL NETWORKS WITH SCALABLE VOCABULARIES

(71) Applicant: Amazon Technologies, Inc., Seattle, WA (US)

(72) Inventors: Devang Kulshreshtha, Montreal (CA); Saket Dingliwal, Kirkland, WA (US); Sravan Babu Bodapati, Fremont, CA (US); Veera Raghavendra Elluru, Hyderabad (IN); Anubhav Mishra, San Carlos, CA (US); Katrin Kirchhoff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 384 days.

(21) Appl. No.: 18/191,644

(22) Filed: Mar. 28, 2023

(51) Int. Cl.
| | |
|---|---|
| *G10L 15/06* | (2013.01) |
| *G06N 3/08* | (2023.01) |
| *G10L 15/02* | (2006.01) |
| *G10L 15/16* | (2006.01) |

(52) U.S. Cl.
CPC .............. *G10L 15/063* (2013.01); *G06N 3/08* (2013.01); *G10L 15/02* (2013.01); *G10L 15/16* (2013.01); *G10L 2015/025* (2013.01); *G10L 2015/0631* (2013.01)

(58) Field of Classification Search
None
See application file for complete search history.

(56) References Cited

U.S. PATENT DOCUMENTS

| | | | |
|---|---|---|---|
| 11,580,959 B2 * | 2/2023 | Freed | ...................... G10L 15/10 |
| 2015/0199960 A1 * | 7/2015 | Huo | ...................... G10L 15/063 |
| | | | 704/245 |

OTHER PUBLICATIONS

Sari et al. "Unsupervised Speaker Adaptation Using Attention-Based Speaker Memory for End-to-End ASR", ICASSP, 2020 (Year: 2020).*

Ganganath et al. "Data Clustering with Cluster Size Constraints Using a Modified k-means Algorithm", 2014 International Conference on Cyber-Enabled Distributed Computing and Knowledge Discovery, 2014 (Year: 2014).*

Alex Graves, "Sequence Transduction with Recurrent Neural Networks", Department of Computer Science, Nov. 14, 2012, 9 pages.

Bai, Y., et al., "Listen Attentively, and Spell Once: Whole Sentence Generation via a Non-Autoregressive Architecture for Low-Latency Speech Recognition", rXiv:2005.04862v4, Aug. 6, 2020, 5 pages.

(Continued)

*Primary Examiner* — Nicole A K Schmieder
(74) *Attorney, Agent, or Firm* — Nicholson De Vos Webster & Elliott LLP

(57) ABSTRACT

Techniques for augmenting automated speech recognition neural networks with scalable vocabularies are described. A cluster is selected from a plurality of clusters of similar sounding words based on a score, the score representing a similarity between an embedding of the cluster and an audio embedding of an utterance generated with an automated speech recognition encoder neural network. A bias factor is calculated based on a similarity between an embedding of a word in the selected cluster and the audio embedding. The audio embedding of the utterance is biased by the bias factor.

19 Claims, 11 Drawing Sheets

(56) References Cited

OTHER PUBLICATIONS

Bruguier, A., et al., "Learning Personalized Pronunciations for Contact Name Recognition", Interspeech, Sep. 8-12, 2016, pp. 3096-3100.

Bruguier, A., et al., "Phoebe: Pronunciation-aware Contextualization for End-to-end Speech Recognition", ICASSP 2019—2019 IEEE International Conference on Acoustics, Speech and Signal Processing (ICASSP), 2019, pp. 6171-6175.

Chan, W., et al., "Listen, Attend and Spell", arXiv:1508.01211v2, Aug. 20, 2015, pp. 1-16.

Das, N., et al., "Listen, Know and Spell: Knowledge-Infused Subword Modeling for Improving ASR Performance of OOV Named Entities", ICASSP 2022—2022 IEEE International Conference on Acoustics, Speech and Signal Processing (ICASSP), 2022, 5 pages.

Dingliwal, S., et al., "Domain Prompts: Towards Memory and Compute Efficient Domain Adaptation of ASR Systems", arXiv:2112.08718v1, Dec. 16, 2021, 5 pages.

Dingliwal, S., et al., "Towards Personalization of CTC Speech Recognition Models with Contextual Adapters and Adaptive Boosting", arXiv:2210.09510v3, Nov. 13, 2022, 8 pages.

Gourav, A., et al., "Personalization Strategies for end-to-end Speech Recognition Systems", arXiv:2102.07739v1, Feb. 15, 2021, 5 pages.

Graves, A., et al., "Speech Recognition with Deep Recurrent Neural Networks", arXiv:1303.5778v1, Mar. 22, 2013, 5 pages.

Gulati, A., et al., "Conformer: Convolution-augmented Transformer for Speech Recognition", Xiv:2005.08100v1, May 16, 2020, 5 pages.

Guo, P., et al., "Recent Developments on Espnet Toolkit Boosted by Conformer", arXiv:2010.13956v2, Oct. 29, 2020, 5 pages.

Gysel, C. V., et al., "Space-Efficient Representation of Entity-centric Query Language Models", arXiv:2206.14885v1, Jun. 29, 2022, 5 pages.

He, Y., et al., "Streaming end-to-end Speech Recognition for Mobile Devices", arXiv:1811.06621v1, Nov. 15, 2018, 5 pages.

Jain, M., et al., "Contextual RNN-T for open Domain ASR", arXiv:2006.03411v2, Aug. 12, 2020, 5 pages.

Jinyu Li, "Recent Advances in End-to-End Automatic Speech Recognition", arXiv:2111.01690v2, Feb. 2, 2022, pp. 1-27.

Kannan, A., et al., "An Analysis of Incorporating an External Language Model Into a Sequence-to-Sequence Model", arXiv:1712.01996v1, Dec. 6, 2017, 5 pages.

Kim, C., et al., "A Review of on-Device Fully Neural End-to-End Automatic Speech Recognition Algorithms", arXiv:2012.07974v3, Aug. 27, 2021, 7 pages.

Kim, S., et al., "Joint CTC-Attention Based End-to-End Speech Recognition Using Multi-Task Learning", arXiv:1609.06773v2, Jan. 31, 2017, 5 pages.

Le, D., et al., "G2G: TTS-Driven Pronunciation Learning for Graphemic Hybrid ASR", arXiv:1910.12612v2, Feb. 13, 2020, 5 pages.

Le. D., et al., "Deep Shallow Fusion for Rnn-T Personalization", arXiv:2011.07754v1, Nov. 16, 2020, 7 pages.

Li, J., et al., "Developing RNN-T Models Surpassing High-Performance Hybrid Models with Customization Capability", arXiv:2007.15188v1, Jul. 30, 2020, 5 pages.

Li, J., et al., "On the Comparison of Popular End-to-End Models for Large Scale Speech Recognition", arXiv:2005.14327v2, Jul. 30, 2020, 5 pages.

Liptchinsky, V., et al., "Letter-Based Speech Recognition With Gated Convnets", arXiv:1712.09444v2, Feb. 16, 2019, pp. 1-10.

Lu, L., et al., "Exploring Transformers for Large-Scale Speech Recognition", arXiv:2005.09684v2, Aug. 11, 2020, 5 pages.

McGraw, I., et al., "Personalized Speech Recognition on Mobile Devices", arXiv:1603.03185v2, Mar. 11, 2016, 5 pages.

Pundak, G., et al., "Deep Context: End-to-End Contextual Speech Recognition", arXiv:1808.02480v1, Aug. 7, 2018, 8 pages.

Sainath, T. N., et al., "No Need for a Lexicon? Evaluating the Value of the Pronunciation Lexica in End-to-End Models", arXiv:1712.01864v1, Dec. 5, 2017, 5 pages.

Salazar, J., et al., "Self-Attention Networks for Connectionist Temporal Classification in Speech Recognition", arXiv:1901.10055v2, Feb. 19, 2019, 6 pages.

Sathyendra, K. M., et al., "Contextual Adapters for Personalized Speech Recognition in Neural Transducers", arXiv:2205.13660v1, May 26, 2022, 5 pages.

Shenoy, A., et al., "Adapting Long Context NLM for ASR Rescoring in Conversational Agents", Interspeech, 2021, 5 pages.

Sravan Bodapati, "Teaching speech recognizers new words—without retraining—Amazon Science", Conversational AI/ Natural—Language Processing, Jan. 13, 2023, pp. 1-7.

Vaswani, A., et al., "Attention Is All You Need", 31st Conference on Neural Information Processing Systems (NIPS 2017), 2017, pp. 1-11.

Wang, C., et al., "VoxPopuli: a Large-Scale Multilingual Speech Corpus for Representation Learning, Semi-Supervised Learning and Interpretation", arXiv:2101.00390v2, Jul. 27, 2021, 11 pages.

Watanabe, S., et al., "ESPnet: End-to-End Speech Processing Toolkit", Interspeech, 2018, pp. 2207-2211.

Watanabe, S., et al., "Hybrid CTC/Attention Architecture for End-to-End Speech Recognition", Journal of Selected Topics in Signal Processing, vol. 11, No. 8, Dec. 2017, pp. 1240-1253.

Yao, Z., et al., "WeNet: Production Oriented Streaming and Non-streaming End-to-End Speech Recognition Toolkit", arXiv:2102.01547v5, Dec. 29, 2021, 5 pages.

Zhao, R., et al., "On Addressing Practical Challenges for RNN-Transducer", arXiv:2105.00858v3, Jul. 18, 2021, 8 pages.

\* cited by examiner

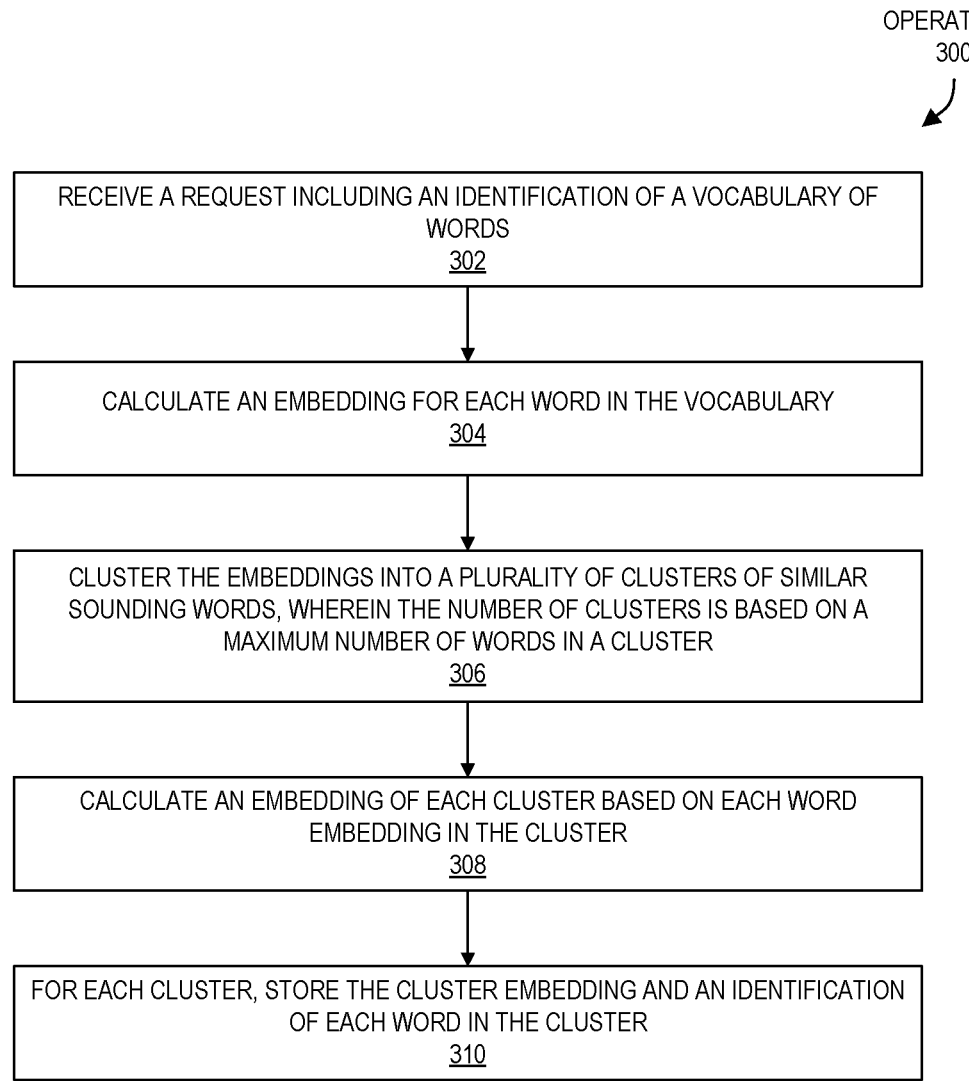

OPERATIONS
300

RECEIVE A REQUEST INCLUDING AN IDENTIFICATION OF A VOCABULARY OF
WORDS
302

CALCULATE AN EMBEDDING FOR EACH WORD IN THE VOCABULARY
304

CLUSTER THE EMBEDDINGS INTO A PLURALITY OF CLUSTERS OF SIMILAR
SOUNDING WORDS, WHEREIN THE NUMBER OF CLUSTERS IS BASED ON A
MAXIMUM NUMBER OF WORDS IN A CLUSTER
306

CALCULATE AN EMBEDDING OF EACH CLUSTER BASED ON EACH WORD
EMBEDDING IN THE CLUSTER
308

FOR EACH CLUSTER, STORE THE CLUSTER EMBEDDING AND AN IDENTIFICATION
OF EACH WORD IN THE CLUSTER
310

*FIG. 3*

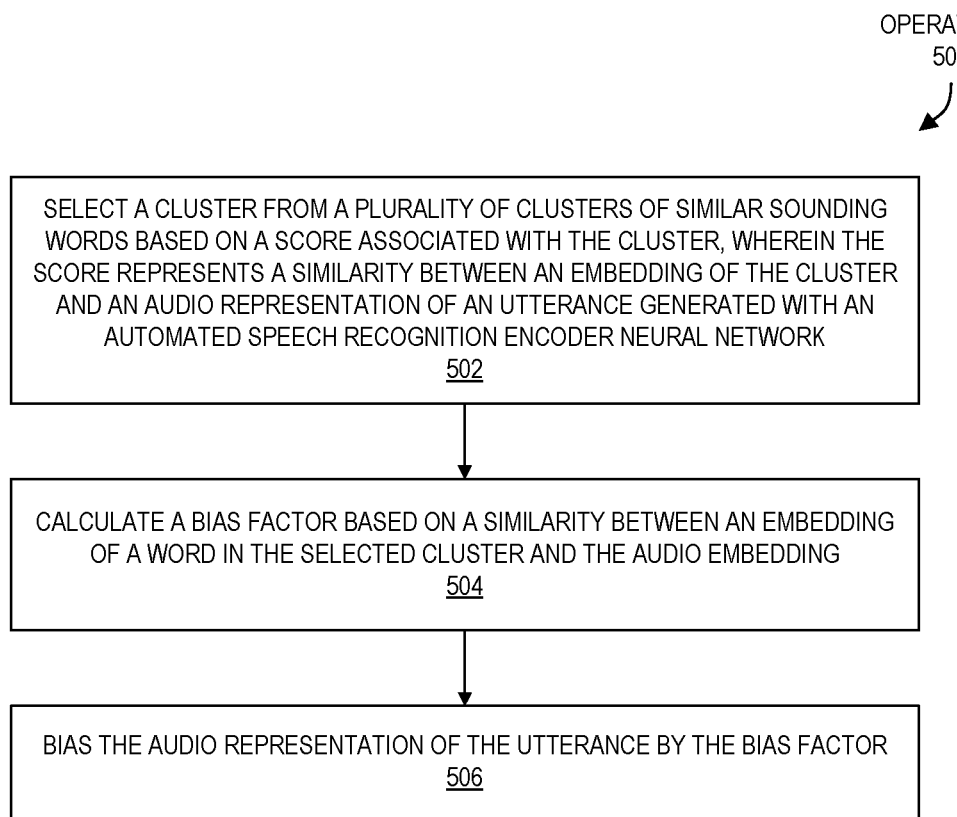

OPERATIONS
500

SELECT A CLUSTER FROM A PLURALITY OF CLUSTERS OF SIMILAR SOUNDING WORDS BASED ON A SCORE ASSOCIATED WITH THE CLUSTER, WHEREIN THE SCORE REPRESENTS A SIMILARITY BETWEEN AN EMBEDDING OF THE CLUSTER AND AN AUDIO REPRESENTATION OF AN UTTERANCE GENERATED WITH AN AUTOMATED SPEECH RECOGNITION ENCODER NEURAL NETWORK
502

CALCULATE A BIAS FACTOR BASED ON A SIMILARITY BETWEEN AN EMBEDDING OF A WORD IN THE SELECTED CLUSTER AND THE AUDIO EMBEDDING
504

BIAS THE AUDIO REPRESENTATION OF THE UTTERANCE BY THE BIAS FACTOR
506

*FIG. 5*

AUGMENTING AUTOMATED SPEECH RECOGNITION NEURAL NETWORKS WITH SCALABLE VOCABULARIES

BACKGROUND

Machine learning (ML) is the study of computer algorithms that can improve automatically through experience and by the use of data. ML algorithms build a model based on sample data, known as training data, in order to make predictions or decisions without being explicitly programmed to do so. ML algorithms are used in a variety of applications, such as in medicine, email filtering, speech recognition, and computer vision, where it is difficult or unfeasible to develop conventional algorithms to perform the needed tasks.

Automated speech recognition (ASR) is one area of ML involving the deployment of machine learning techniques to recognize user speech. ASR systems are often found in the frontend interface to a variety of systems such as automated telephone answering systems, conversational agents, voice controlled systems, smart home appliances, etc.

BRIEF DESCRIPTION OF DRAWINGS

Various examples in accordance with the present disclosure will be described with reference to the drawings, in which:

FIG. 3 illustrates a flow diagram of a method for clustering vocabularies according to some examples.

FIG. 5 illustrates a flow diagram of a method for augmenting an automated speech recognition neural network with a vocabulary according to some examples.

DETAILED DESCRIPTION

Figure 1:
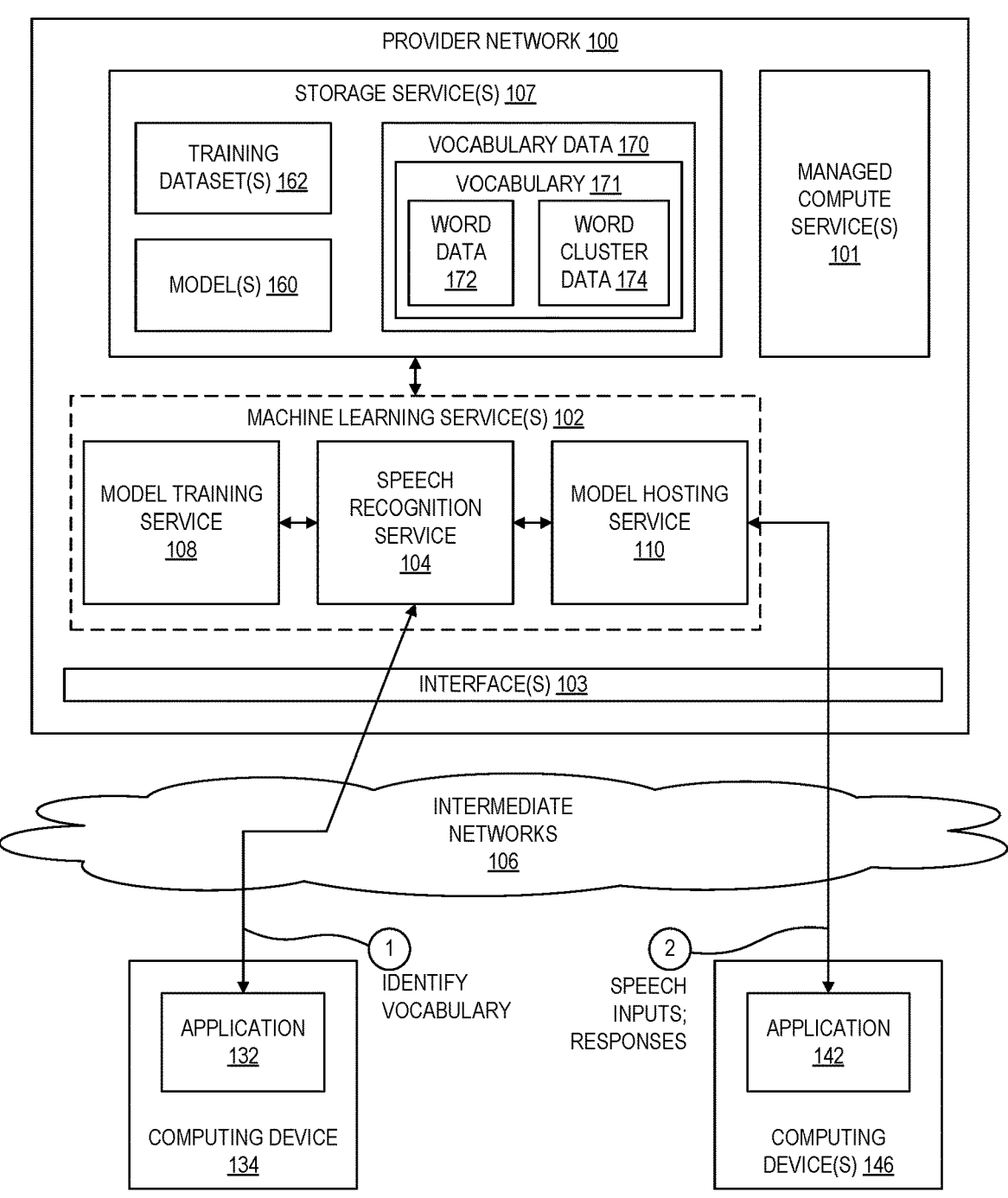
FIG. 1 illustrates a block diagram of an environment for automated speech recognition neural networks with scalable vocabularies according to some examples.

The present disclosure relates to methods, apparatus, systems, and non-transitory computer-readable storage media for augmenting automated speech recognition (ASR) neural networks with scalable vocabularies. Machine learning (ML) ASR techniques include neural network based models that are trained to generate a text prediction from a digitized sound file of a user utterance (e.g., a wave file). Domain-specific terminology can be challenging for ASR ML systems trained using generalized training data sets. For example, an ASR ML neural network trained on the English language may have reduced accuracy when deployed in specialized fields such as travel, medicine, finance, insurance, medicine, etc. As used herein, a vocabulary refers to a set of words or phrases applicable to a particular field, customer, etc. Vocabularies may also be referred to as catalogs or lexicons.

Traditional approaches for handling domain-specific vocabularies often involve training specialized ASR models. Such approaches limit the flexibility of the underlying model and can create complexities when deployed to support multi-domain vocabularies. Additionally, such approaches also come with a cost—typically in the form of increased inference latency (e.g., the amount of time it takes to generate a text prediction from an audio sample).

Inference latency is a metric used to evaluate the suitability of a model for a deployment environment. A model that takes 15 minutes to perform a prediction would hardly be suitable for a customer service chatbot. At the same time, traditional techniques for handling large vocabulary sizes come at the cost of increased inference latency. Inference latency can thus be thought of as a measurement of the tradeoff between accuracy and speed—slower ASR models may provide more accurate text predictions at slower speeds, leading to a less satisfactory user experience.

To support large vocabularies while remaining performant (e.g., satisfying inference latency time budgets), examples disclosed herein leverage an attention module (a trained neural network, sometimes referred to as an attention mechanism) to first identify a cluster of words germane to an audio utterance being evaluated (e.g., similar sounding) and then bias an ASR model using the associated cluster data. By clustering vocabularies and then adapting predictions based on a cluster of the vocabulary most similar to an utterance under evaluation, the ASR systems described herein can support scalable vocabulary sizes (e.g., 10,000; 100,000; 500,000 words or more) while still satisfying inference latency budgets.

To provide a concrete example, one vocabulary might include names of people. An ASR system may be asked to generate a text corresponding to a user utterance saying "Hi, my name is Kaily." The ASR system can generate a preliminary representation (typically a high-dimensional vector or set of vectors) of the utterance "Kaily." The ASR system can then select a cluster of words in the vocabulary based on their sound-level similarity (e.g., phonetic similarity) to the preliminary representation, such as a cluster including the names Haley, Halley, Hailey, Keley, Kelly, and Kaily. The ASR system can then evaluate the sound-level similarities between each of the words in the selected cluster and the preliminary representation of the utterance and then bias the preliminary representation to increase the likelihood that the text prediction of the utterance is "Kaily" rather than "Hailey."

According to some examples, a contextual adapter augments an ASR model using attention modules. The contextual adapter allows the customization of a baseline or "customer-agnostic" ASR system to a particular domain (e.g., city names for a travel application, person names for a customer service application, medicine or disease names for a medical application, etc.). A first attention module of the contextual adapter evaluates the similarity between the preliminary audio embedding of a user utterance and an embedding representing a cluster of similar sounding words. A second attention module of the contextual adapter then evaluates the similarity between the preliminary audio embedding and the embeddings of each word in the cluster most similar to the preliminary representation, generating a bias to apply to the preliminary audio embedding to increase the likelihood that the associated text prediction is accurate. In some examples, the two attention modules share parameters (e.g., weights and biases of a neural network).

FIG. 1 illustrates a block diagram of an environment for automated speech recognition neural networks with scalable vocabularies according to some examples. One environment in which ASR systems are commonly deployed is in provider networks, although ASR systems can also be deployed in other contexts such as on personal computers, portable devices, etc. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s) 103, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 103 can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services 101 include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

The provider network 100 further includes storage service (s) 107. Storage services can include various types of storage for the managed compute services. Exemplary types include object-level storage (e.g., to store ASR models, audio files, text files, etc.), block-level storage (e.g., to provide a disk-like interface to managed compute systems), database storage (e.g., SQL or NoSQL databases that can be queried), etc. The provider network 100 further includes machine learning services 102 that allow customers of the provider network to build and deploy machine learning applications such as ASR. Each of these services may be implemented via software, hardware, or a combination of both, and may be implemented in a distributed manner using multiple different computing devices. In the ASR context, the storage services can store ASR models 160 and ASR training datasets 162 for machine learning services 102.

The machine learning services 102 include a model training service 108 and a model hosting service 110. Briefly, the model training service 108 and model hosting service 110 can provide support for a variety of machine learning services by providing compute resources on which to train and deploy machine learning models. Additional details regarding training and deployment of machine learning models are provided with reference to FIG. 8. Machine learning services can include computer vision services, code review services, and, of relevance here, speech recognition services such as speech recognition service 104, which itself may be leveraged by other services such as a transcription service or a chatbot service.

In some examples, the speech recognition service 104 trains a baseline ASR neural network model using the model training service 108. The baseline ASR model serves as an application- or customer-agnostic model. Additionally, the speech recognition service 104 trains a contextual adapter neural network model that allows for application- or customer-specific vocabularies to be applied to the baseline model. An exemplary neural network architecture including a baseline model and a contextual adapter model is illustrated in FIG. 3. Additional details of the training of a baseline model and of a contextual adapter model are respectively provided with reference to FIGS. 6, 7, and 8.

The speech recognition service 104 can host ASR models on behalf of customers via the model hosting service 110. The model hosting service 110 can host one trained ASR model for one customer and another trained ASR model for a different customer. Customers (or customers' users) can submit audio samples, typically in the form of a digital audio file such as a .wav file, to a hosted ASR model for speech-to-text translation. Additional details regarding inference operations of an exemplary ASR model are provided with reference to FIG. 4. Additional details regarding the hosting or deployment of models are provided with reference to FIG. 8. Briefly, model training and hosting are typically performed using one or more computer systems that execute model training/model hosting software programs written in Python, C, C++, etc.

In some examples, customers can identify one or more vocabularies to use to customize a baseline ASR model as part of deploying a system or application including ASR support, as indicated at circle 1. For example, a customer of the provider network 100 operating an application 132 on a computing device 134 can submit a request via the interface 103, the request including an identification of a vocabulary 171 to use to customize the baseline ASR model. The identified vocabulary 171 can be one of a set of pre-defined vocabularies (e.g., names, places, etc.) or a custom vocabulary applicable to the customer's field or domain. The vocabulary 171 can be uploaded as part of the request. The identified vocabulary 171 can be stored along with other vocabularies as vocabulary data 170 in the storage services 107. An exemplary vocabulary (prior to clustering operations) may be simply a set of words, indicated at word data 172.

In some examples, end users of a deployed ASR system can submit speech for ASR to a hosted ASR model, such as via an HTTP message including an API request to an identified ASR model, as indicated at circle 2. For example, an audio recording of an utterance can be submitted to the model hosting service 110 via an application 142 executed on a computing device 146 operated by the user. The ASR model can generate a text prediction from the audio submission and return that text prediction to the application 142 and/or to another service or system hosted by the provider network 100 such as a chatbot or conversational agent (not shown).

Figure 2:
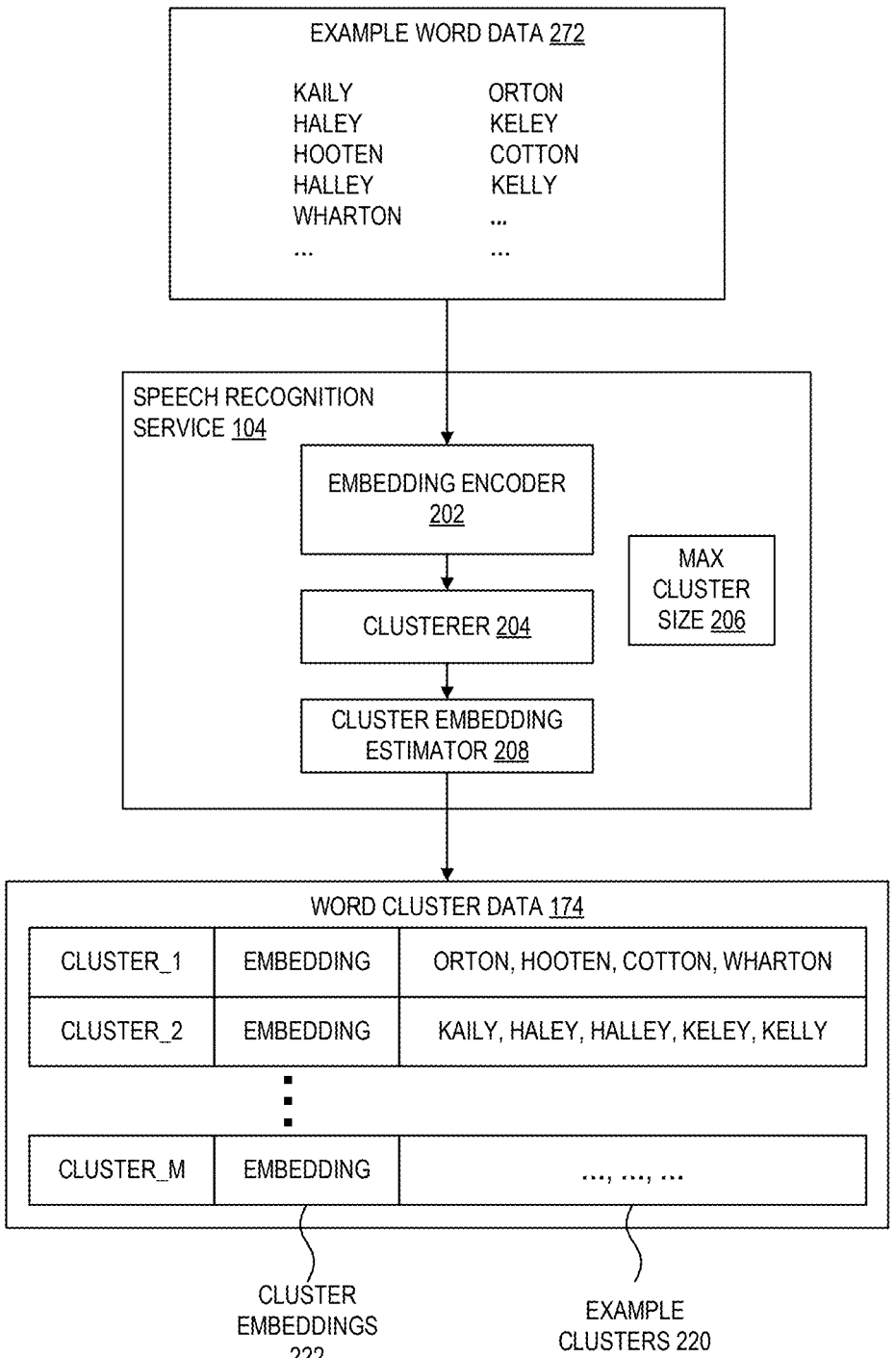
FIG. 2 illustrates a block diagram of an environment for clustering vocabularies based on similar sounding words according to some examples.

FIG. 2 illustrates a block diagram of an environment for clustering vocabularies based on similar sounding words according to some examples. As illustrated, example word data 272 includes, for each word in a vocabulary (or catalog or lexicon) a set of words. An embedding encoder 202 calculates an embedding for each word in the word data 272. Conceptually, embeddings can be thought of as a mathematical representation of the pronunciation of a word. For example, a word embedding in this context might be a size 96, 128, etc. vector that places the word in a multi-dimensional embedding space near other similar sounding words. The embedding encoder 202 can be a neural network having an input layer of neurons, one or more hidden layers, and an output layer. In some examples, the words are tokenized by a tokenizer (not shown) into subwords. For example, a tokenizer might tokenize the word "important" into three subwords "im," "port," and "ant." The embedding encoder 202 can process each of these subwords to map them into the embedding space near words with similar pronunciations. An exemplary embedding encoder 202 is trained as part of the training of a contextual adapter neural network, such as described below with reference to FIG. 7.

A clusterer 204 clusters the embeddings of the words into clusters of similar sounding words. For example, the well-known k-means clustering algorithm can be used to cluster embeddings within the embedding space. A maximum cluster size 206 defines the maximum number of words in a cluster. The maximum size is typically a function of the ASR model architecture that will use the vocabulary and the allowable inference latency. For example, an ASR model might be able to satisfy an inference latency constraint when adapting to up to 2,000 domain-specific words at a time, so the maximum cluster size would be 2,000. In one approach, the number of clusters in k-means clustering (that is, k) can be initially set based on the total number of words in the vocabulary divided by the maximum cluster size. If, after clustering, a cluster includes a number of words that exceed the maximum cluster size, clustering operations can be repeated targeting an increased number of clusters.

Once the embeddings have been clustered into some set of clusters satisfying the maximum cluster size constraint, a cluster embedding estimator 208 can calculate an embedding representing the cluster. For example, the cluster embedding estimator 208 can average each of the word embeddings in a particular cluster to generate an average cluster embedding of that cluster that represents an approximate center of the cluster within the embedding space.

The speech recognition service 104 can store results of the above operations as word cluster data 174. In some examples, word cluster data 174 includes, for each cluster, the cluster embedding and the word embeddings for each word in the cluster. In doing so, the word embeddings are cached potentially reducing the need to recompute them during inference. In other examples, word cluster data 174 includes, for each cluster, the cluster embedding and word data 172 for each word in the cluster to calculate the associated word embeddings. Note that the word data may be a reference to the word data 172. In some examples, the speech recognition service 104 stores the word cluster data 174 with a storage service 107 of the provider network 100 for subsequent use by the model hosting service 110 during inference operations.

To illustrate, prior to clustering, an example vocabulary with word data 272 includes names such as Kaily, Haley, Hooten, Halley, Orton, Keley, Cotton, Kelly, and Warton. Through the clustering operations, the vocabulary is divided into M clusters as shown in example clusters 220: cluster #1 includes the names Orton, Hooten, Cotton, and Wharton, cluster #2 includes the names Kaily, Haley, Halley, Keley, and Kelly, cluster M includes other similar-sounding names, and so on.

FIG. 3 illustrates a flow diagram of a method for clustering vocabularies according to some examples. Some or all of the operations 300 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 300 are performed by compute resources of a provider network of the other figures.

The operations 300 include, at block 302, receiving a request including an identification of a vocabulary of words. For example, the speech recognition service can receive a request originating from a user application that includes an identification of a vocabulary (sometimes referred to as a lexicon or catalog) of words to be used to augment an ASR machine learning model. The operations 300 further include, at block 304, calculating an embedding for each word in the vocabulary based on at least one of an audio sample of a pronunciation of the word or a phonetic representation of the word. The operations 300 further include, at block 306, clustering the embeddings into a plurality of clusters of similar sounding words, wherein the number of clusters is based on a maximum number of words in a cluster. The operations 300 further include, at block 308, calculating an embedding of each cluster based on each word embedding in the cluster. The operations 300 further include, at block 310, for each cluster, storing the cluster embedding and an identification of each word in the cluster.

Figure 4:
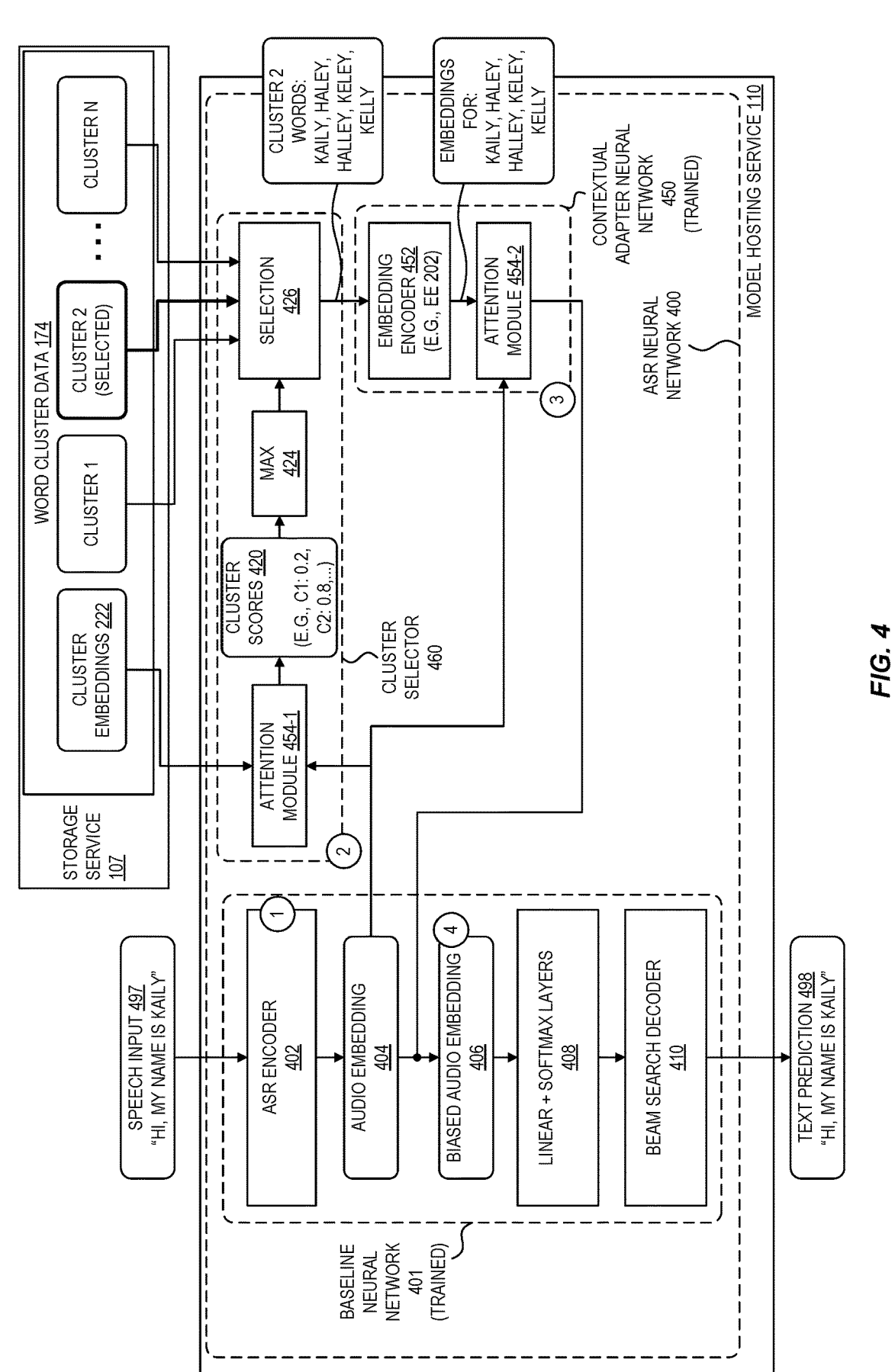
FIG. 4 illustrates a block diagram of a model architecture of an automated speech recognition neural network with scalable vocabulary support according to some examples.

FIG. 4 illustrates a block diagram of a model architecture of an automated speech recognition neural network with scalable vocabulary support according to some examples. An ASR neural network 400 includes a baseline neural network 401 and a contextual adapter neural network 450. At a high level, the baseline neural network 401 processes speech input audio 497 (e.g., user utterances) such as a wave file to generate text predictions 498. The contextual adapter neural network 450 biases the baseline neural network 401 to improve the text predictions 498 for certain words.

In some examples, the baseline neural network 401 and contextual adapter neural network 450 are trained in stages such as described with reference to FIGS. 6 and 7.

The ASR neural network 400 further includes a cluster selector 460 to feed the contextual adapter neural network 450 with word cluster data 174 relevant to the utterance being processed. In doing so, the cluster selector 460 allows the ASR neural network 400 to consider a large vocabulary that might otherwise violate inference latency requirements.

An exemplary set of operations as part of a speech-to-text inference are now described with reference to the circled numbers 1 through 4. The baseline neural network 401 includes an ASR encoder 402. At circle 1, the ASR encoder 402 calculates an audio embedding 404 from a speech input utterance 497 (typically recorded in a digital audio file). In some examples, the ASR encoder 402 can operate as follows. The ASR encoder 402 can be comprised of a series of N conformer blocks which combine transformer and convolution modules, such as described in the art. Each Conformer block includes two feed-forward modules that sandwich a multi-headed self-attention module and a convolution module. Input samples at time steps t are fed into the ASR encoder 402. In some examples, a convolution frontend with Conv2D layers downsamples the input features by a factor of four before feeding them to the first conformer block. Later, the linear and softmax layers 408 of the baseline neural network 401 transform the biased audio embedding 406 to a final output distribution.

At circle 2, the cluster selector 460 selects a cluster of vocabulary words for a downstream attention module to attend to based on the similarity between the cluster and the audio embedding 404. In some examples, the cluster selector 460 retrieves the cluster embeddings 222 from the storage service 107. The cluster selector 460 includes an attention module 454-1 that generates cluster scores 420 for each cluster based on the similarity between the cluster embeddings 222 (e.g., the average of the embeddings of the clustered words) and the audio embedding 404. In some examples, the attention module 454-1 is of a query-key-value type dot-product attention module having learned weights to generate the query, keys, and values corresponding to the keys from the inputs. Weights in this context refers to a matrices of values learned during training of the attention module. Using dot product attention and applying the query weights to the audio embedding 404 to generate the query, the key weights to the cluster embeddings 222 to generate the keys, and the value weights to the cluster embeddings 222 to generate the values, the attention module 454-2 generates a bias factor with increased weighting applied to those values having keys more similar to the query. In some examples, the resulting weighting for each cluster embedding represents the cluster score 420.

The cluster selector 460 performs a maximum 424 operation to identify the cluster having the highest score and a selection 426 operation to retrieve the word cluster data 174 for the cluster. In this example, assuming cluster #2 has the highest score of 0.8, the cluster selector 460 would select cluster #2 for processing by the contextual adapter neural network 450. The cluster selector 460 retrieves the remaining cluster word data from the storage service 107, which may be cached embeddings computed during clustering operations or other data from which the word embeddings can be calculated.

At circle 3, the contextual adapter neural network 450 processes the words in the selected cluster to calculate a bias factor to be fed back to the baseline neural network 401. An embedding encoder 452 generates embeddings for the words in the cluster based on the word. Note that the embedding encoder 452 here is typically the same embedding encoder used in clustering operations such as described with reference to FIG. 2. Continuing with the above selection example, the embedding encoder 452 would generate embeddings for each of the words in the selected cluster #2 (e.g., Kaily, Haley, etc.). If the word embeddings were cached as part of word cluster data 174, the embedding encoder 452 may be omitted with the cached word embeddings input to the next stage of the contextual adapter network 450.

In some examples, the embedding encoder 452 can operate as follows. Assume a set of K custom entity words (e.g., $$\{w^j\}_{j=1}^{j=K}.$$

Words can be tokenized into subwords as sequences of tokens (e.g., $$\{c_1^j, c_2^j, \dots c_n^j\}$$

An embedding lookup is performed (parameterized by $\phi$) to create a sequence of vectors $$\{c_{1:n}^j\}^\phi.$$

The subword embeddings can then be processed using the well-known Bidirectional Long Short-Term Memory (BiLSTM) neural network parameterized by $\psi$ to create the word embedding $$C^j = \text{BiLSTM}_\psi\left(\{c_{1:n}^j\}^\phi\right).$$

Using the embeddings from the embedding encoder 452, an attention module 454-2 generates a bias factor to bias the audio embedding 404. Like attention module 454-1, the attention module 454-2 is of a query-key-value type dot-product attention module having weights for the query (e.g., the audio embedding) and weights to generate keys and corresponding values from the cluster embeddings. In some examples, the learned parameters (e.g., weights, biases, etc.) of the attention modules 454-1 and 454-2 are the same. Using dot product attention and applying the query weights to the audio embedding 404 to generate the query, the key weights to the word embeddings to generate the keys, and the value weights to the word embeddings to generate the values, the attention module 454-2 generates a bias factor with increased weighting applied to those values having keys more similar to the query.

In some examples, the attention module 454-2 includes a transformer decoder block and a softmax layer with outputs compared against reference outputs using a cross-entropy criterion. Using the embeddings from the embedding encoder 452 as keys and values to obtain a context vector that is added to the output of the last layer of the ASR encoder 402 (e.g., the final conformer in the staged conformer architecture described above). As an exemplary formal formulation, let $$\{e_t^i\}_{i=1}^{i=N}$$

represent the output of each of the N conformer blocks in the above described conformer-based ASR encoder 402 architecture at time step t. A set of N trainable weights $$\{w^i\}_{i=1}^{i=N}$$

forms the attention query in the below equation, with the output of the attention module 454-2 being:

$$b_t = \mathrm{Attn}\big(W^q q_t,\ W^k C^e,\ W^v C^e\big) \text{ where } q_t = \sum_1^N w^i e_t^i$$

and $W^q$, $W^k$, and $W^v$ are query, key, and value weight matrices respectively, $C^e$ is of the form $\mathcal{R}^{K \times D}$ of concatenated word embeddings of dimension D, and Attn( ) is the well-known attention function. (Note that the same learned weights can be applied in the calculations using the attention module 454-1.)

At circle 4, the baseline neural network 401 biases the audio embedding 404 with the bias factor. For example, the bias factor can be of the same dimensionality as the audio embedding 404 and each value of the bias factor values is added to the value in the corresponding position in the audio embedding (e.g., in an element-wise operation). In some examples, the biasing is performed as follows:

$$e_{t,bias}^N = e_t^N + b_t.$$

In some examples, the biased audio embedding 406 is further processed using techniques known to those of skill in the art to generate the text prediction 498. For example, a linear (or fully-connected) layer and a softmax operation (block 408) can process the biased audio embedding 406, followed by a beam search decoder 410 to collapse the biased audio embedding into the text prediction 498.

FIG. 5 illustrates a flow diagram of a method for augmenting an automated speech recognition neural network with a vocabulary according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 300 are performed by compute resources of a provider network of the other figures.

The operations 500 include, at block 502, selecting a cluster from a plurality of clusters of similar sounding words based on a score associated with the cluster, wherein the score represents a similarity between an embedding of the cluster and an audio embedding of an utterance generated with an automated speech recognition encoder neural network. For example, the cluster selector 460 of FIG. 4 scores and selects a cluster having an cluster embedding most similar to the audio embedding of an utterance. The operations 500 further include, at block 504, calculating a bias factor based on a similarity between an embedding of a word in the selected cluster and the audio embedding. For example, the attention module 454-2 of FIG. 4 evaluates the similarity between a word embedding of a word in the selected cluster and the audio embedding. The operations 500 further include, at block 506, biasing the audio embedding of the utterance by the bias factor. For example, the output of the attention module 454-2 is added to the audio embedding 404.

Figure 6:
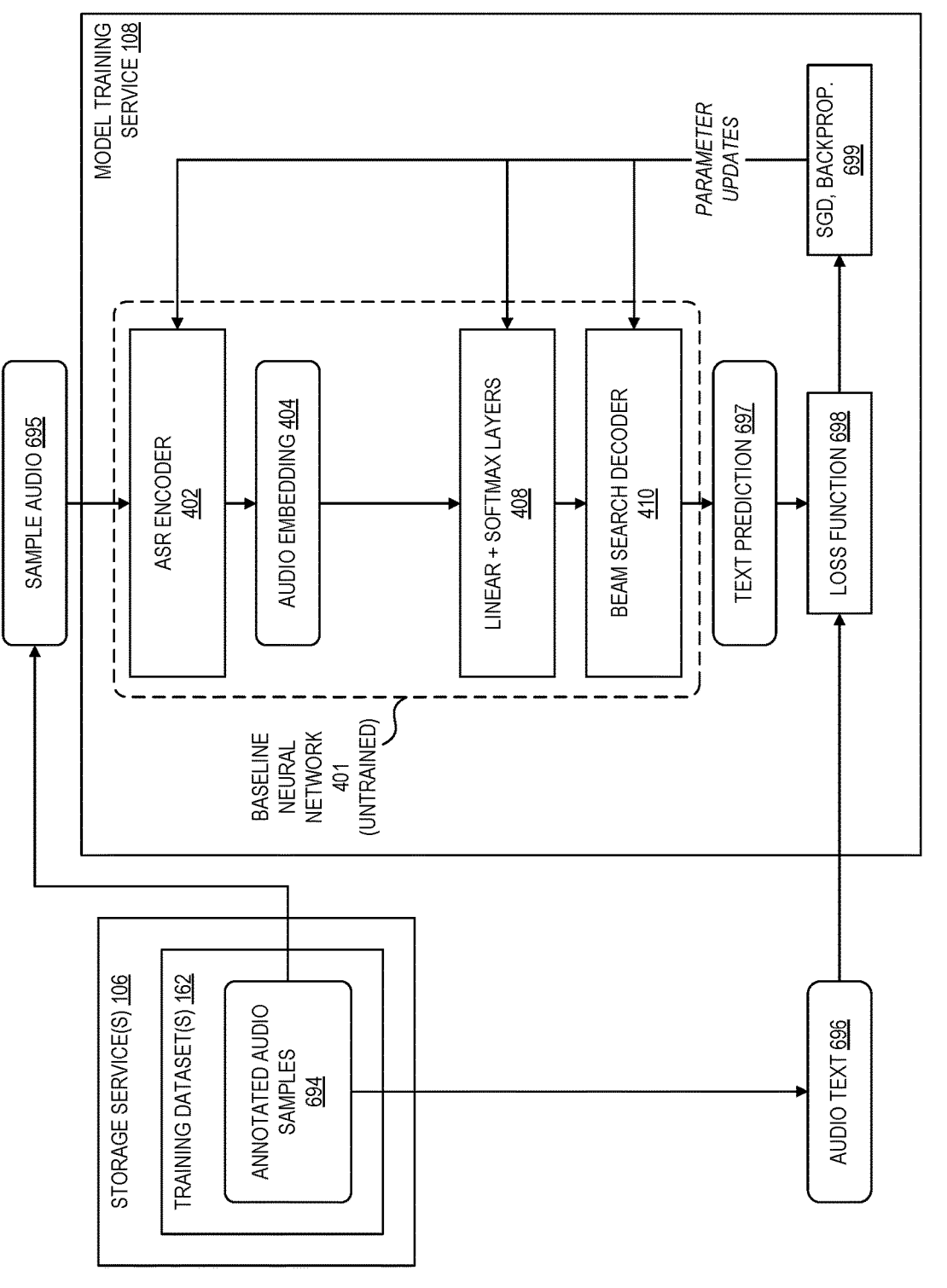
FIG. 6 illustrates a block diagram of an environment for training a baseline automated speech recognition neural network according to some examples.

FIG. 6 illustrates a block diagram of an environment for training a baseline automated speech recognition neural network according to some examples. As illustrated, a model training service 108 trains an untrained baseline neural network 401 using training datasets 162. A typical training dataset includes annotated audio samples 694 (e.g., audio samples 695 with corresponding ground-truth audio text 696). During training, the model training service 108 performs a forward pass using the network 401 to compute text predictions 697 on one or more audio samples 695 in the annotated audio samples 694. The model training service 108 uses a loss function 698 to evaluate the difference between the text predictions 697 and their corresponding text 696. Based on that difference, or error, the model training service 108 updates the model parameters (e.g., weights and biases in the network). For example, the model training service 108 can use the well-known stochastic gradient descent and backpropagation techniques 699 to calculate the parameter updates, update the model, and continue training (e.g., evaluating a next forward pass).

Figure 7:
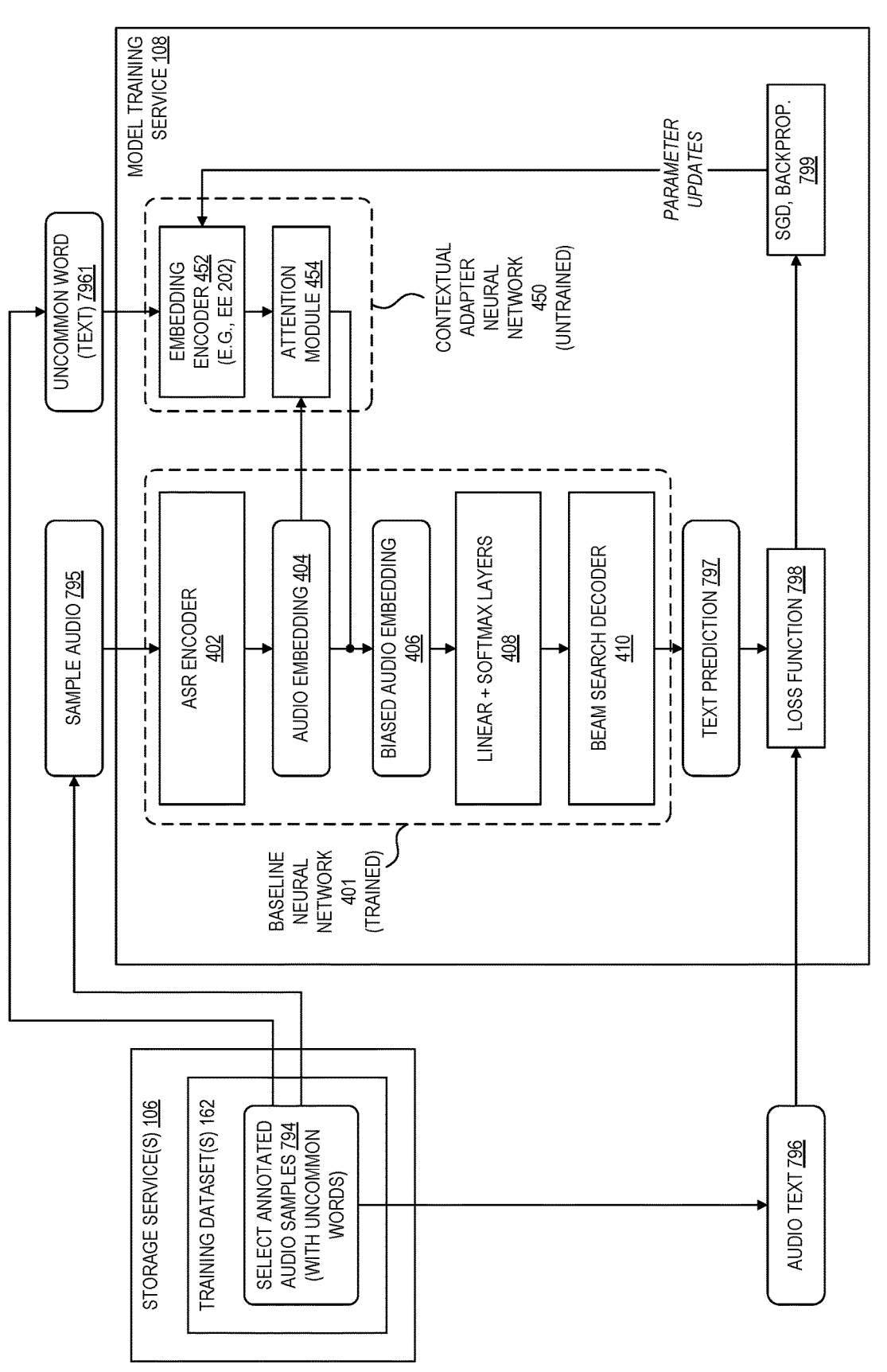
FIG. 7 illustrates a block diagram of environment for training a contextual adapter neural network for a baseline automated speech recognition neural network according to some examples.

FIG. 7 illustrates a block diagram of environment for training a contextual adapter neural network for a baseline automated speech recognition neural network according to some examples. As illustrated, a model training service 108 trains an untrained contextual adapter neural network 450 again using training datasets 162. As before, training datasets typically include annotated audio samples 794 (e.g., audio samples 795 with corresponding ground-truth audio text 796). Here, the annotated audio samples 794 are a selection of samples from a larger corpus of training data (e.g., annotated audio samples 694). The selection is typically based on samples including uncommon or infrequent words, allowing the contextual adapter neural network 450 to augment the baseline neural network 401 when those uncommon words appear in an input utterance. Uncommon words can be identified based on their frequency in the training dataset. For example, the select annotated audio samples 794 can include samples having words with a word-frequency in a larger training dataset below a threshold. For example, if the word "hydroxide" only appears in 10 audio samples and the threshold is 20, samples including the word "hydroxide" would be included in the select annotated audio samples 794.

During training, the model training service 108 performs a forward pass using the network 450 to compute text predictions 797 on one or more audio samples 795 in the select annotated audio samples 794. The model training service 108 uses a loss function 798 to evaluate the difference between the text predictions 797 and their corresponding text 796. In some examples, the uncommon word text 7961 is a subset of the audio text. For example, the sample audio 795 might be the utterance "Hi, my name is Kaily" with a corresponding audio text 796, while the uncommon word text 7961 is the text "Kaily" (the uncommon word). Based on that difference, or error, the model training service 108 updates the model parameters (e.g., weights and biases in the network), again using, for example, the well-known stochastic gradient descent and backpropagation techniques 799 to calculate the parameter updates, update the model, and continue training.

Figure 8:
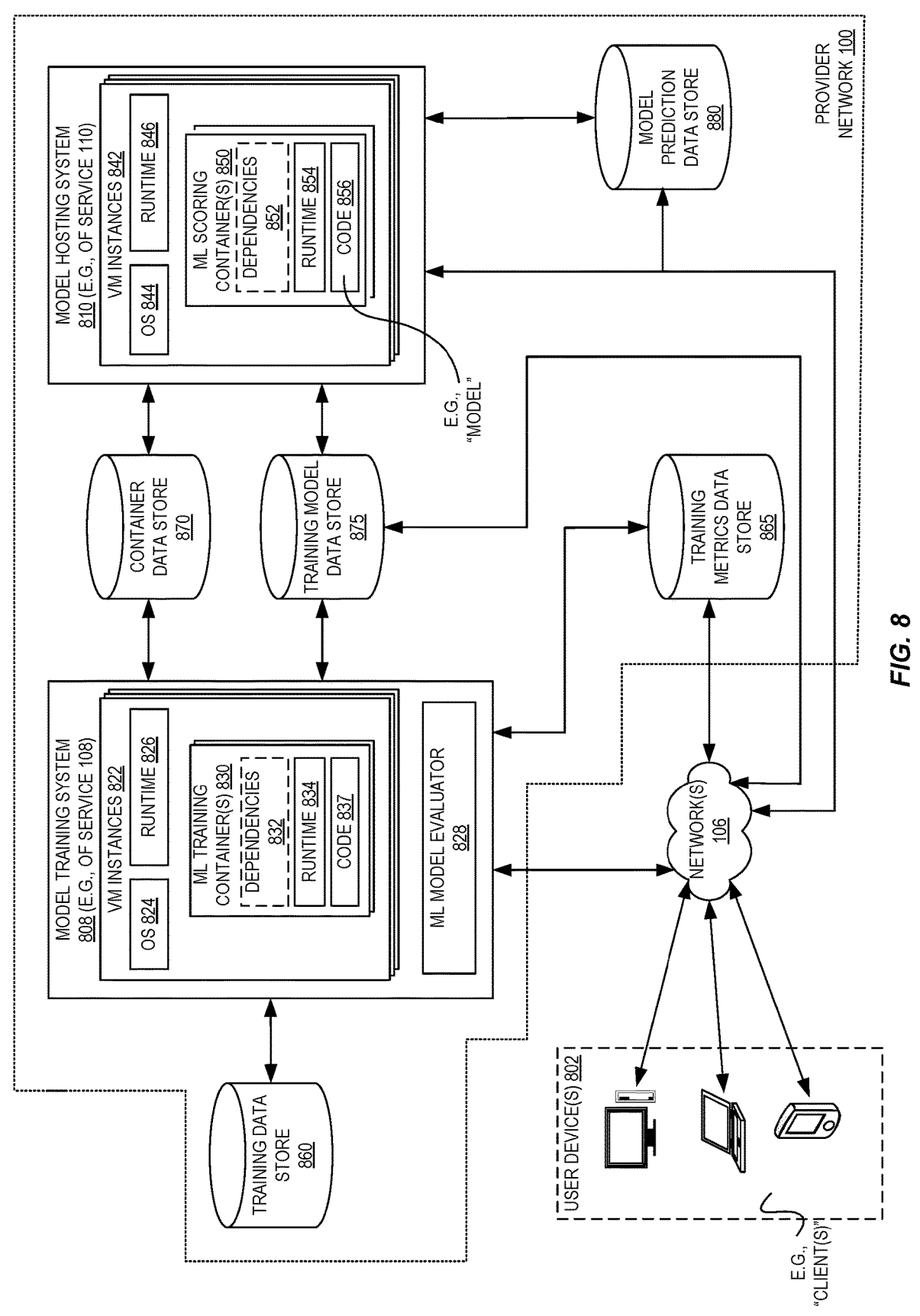
FIG. 8 illustrates a block diagram of an environment in which machine learning models are trained and hosted according to some examples.

FIG. 8 illustrates a block of diagram an environment in which machine learning models are trained and hosted according to some examples. The operating environment includes end user devices 802 (for example, computing devices(s), edge device(s)), a model training system, a model hosting system, a training data store 860, a training metrics data store 865, a container data store 870, a training model data store 875, and a model prediction data store 880.

A machine learning service described herein may include one or more of these entities, such as the model hosting system 810, model training system 808, and so forth.

In some examples, users, by way of user devices 802, interact with the model training system 808 to provide data that causes the model training system 808 to train one or more machine learning models, for example, as described elsewhere herein. A machine learning model, generally, may be thought of as one or more equations that are "trained" using a set of data. In some examples, the model training system 808 provides ML functionalities as a web service, and thus messaging between user devices 802 and the model training system 808 (or provider network 100), and/or between components of the model training system 808 (or provider network 100), can use HTTP messages to transfer data in a machine-readable file format, such as extensible Markup Language (XML) or JavaScript Object Notation (JSON). In some examples, providing access to various functionality as a web service is not limited to communications exchanged via the World Wide Web and more generally refers to a service that can communicate with other electronic devices via a computer network.

The user devices 802 can interact with the model training system 808 via frontend 829 of the model training system 808. For example, a user device 802 can provide a training request to the frontend 829 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some examples, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some examples, the algorithm is pre-generated and obtained by a user, via the user device 802, from an algorithm repository (for example, a network-accessible marketplace, a data store provided by a machine learning training service, etc.). In some examples, the algorithm is completely user-generated or partially user-generated (for example, user-provided code modifies or configures existing algorithmic code).

In some examples, instead of providing a container image (or identifier thereof) in the training request, the user device 802 may provide, in the training request, an algorithm written in any programming language. The model training system 808 then packages the algorithm into a container (optionally with other code, such as a "base" ML algorithm supplemented with user-provided code) that is eventually loaded into a virtual machine instance 822 for training a machine learning model, as described in greater detail below. For example, a user, via a user device 802, may develop an algorithm/code using an application (for example, an interactive web-based programming environment) and cause the algorithm/code to be provided—perhaps as part of a training request (or referenced in a training request)—to the model training system 808, where this algorithm/code may be containerized on its own or used together with an existing container having a machine learning framework, for example.

In some examples, instead of providing a container image in the training request, the user device 802 provides, in the training request, an indicator of a container image (for example, an indication of an address or a location at which a container image is stored). For example, the container image can be stored in a container data store 870, and this container image may have been previously created/uploaded by the user. The model training system 808 can retrieve the container image from the indicated location and create a container using the retrieved container image. The container is then loaded into a virtual machine instance 822 for training a machine learning model, as described in greater detail below.

The model training system 808 can use the information provided by the user device 802 to train a machine learning model in one or more pre-established virtual machine instances 822 in some examples. In particular, the model training system 808 includes a single physical computing device or multiple physical computing devices that are interconnected using one or more computing networks (not shown), where the physical computing device(s) host one or more virtual machine instances 822. The model training system 808 can handle the acquisition and configuration of compute capacity (for example, containers, instances, etc., which are described in greater detail below) based on the information describing the computing machine on which to train a machine learning model provided by the user device 802. The model training system 808 can then train machine learning models using the compute capacity, as is described in greater detail below. The model training system 808 can automatically scale up and down based on the volume of training requests received from user devices 802 via frontend 829, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some examples, the virtual machine instances 822 are used to execute tasks. For example, such tasks can include training a machine learning model. As shown in FIG. 8, each virtual machine instance 822 includes an operating system (OS) 824, a language runtime 826, and one or more ML training containers 830. Generally, the ML training containers 830 are logical units created within a virtual machine instance using the resources available on that instance and can be used to isolate execution of a task from other processes (for example, task executions) occurring in the instance. In some examples, the ML training containers 830 are formed from one or more container images and a top container layer. Each container image may further include one or more image layers, where each image layer represents an executable instruction. As described above, some or all of the executable instructions together represent an algorithm that defines a machine learning model. Changes made to the ML training containers 830 (for example, creation of new files, modification of existing files, deletion of files, etc.) are stored in the top container layer. If a ML training container 830 is deleted, the top container layer is also deleted. However, the container image(s) that form a portion of the deleted ML training container 830 can remain unchanged. The ML training containers 830 can be implemented, for example, as Linux containers (LXC), Docker containers, and the like.

The ML training containers 830 may include individual a runtime 834, code 837, and dependencies 832 needed by the code 837 in some examples. The runtime 834 can be defined by one or more executable instructions that form at least a portion of a container image that is used to form the ML training container 830 (for example, the executable instruction(s) in the container image that define the operating system and/or runtime to run in the container formed from the container image). The code 837 includes one or more executable instructions that form at least a portion of a container image that is used to form the ML training container 830. For example, the code 837 includes the executable instructions in the container image that represent an algorithm that defines a machine learning model, which may reference (or use) code or libraries from dependencies 832. The runtime 834 is configured to execute the code 837 in response to an instruction to begin machine learning model training. Execution of the code 837 results in the generation of model data, as described in greater detail below.

In some examples, the code 837 includes executable instructions that represent algorithms that define different machine learning models. For example, the code 837 includes one set of executable instructions that represent a first algorithm that defines a first machine learning model and a second set of executable instructions that represent a second algorithm that defines a second machine learning model. In some examples, the virtual machine instance 822 executes the code 837 and trains all of the machine learning models. In some examples, the virtual machine instance 822 executes the code 837, selecting one of the machine learning models to train. For example, the virtual machine instance 822 can identify a type of training data indicated by the training request and select a machine learning model to train (for example, execute the executable instructions that represent an algorithm that defines the selected machine learning model) that corresponds with the identified type of training data.

In some examples, the runtime 834 is the same as the runtime 826 used by the virtual machine instance 822. In some examples, the runtime 834 is different than the runtime 826 used by the virtual machine instance 822.

In some examples, the model training system 808 uses one or more container images included in a training request (or a container image retrieved from the container data store 870 in response to a received training request) to create and initialize a ML training container 830 in a virtual machine instance 822. For example, the model training system 808 creates an ML training container 830 that includes the container image(s) and/or a top container layer.

Prior to beginning the training process, in some examples, the model training system 808 retrieves training data from the location indicated in the training request. For example, the location indicated in the training request can be a location in the training data store 860. Thus, the model training system 808 retrieves the training data from the indicated location in the training data store 860. In some examples, the model training system 808 does not retrieve the training data prior to beginning the training process. Rather, the model training system 808 streams the training data from the indicated location during the training process. For example, the model training system 808 can initially retrieve a portion of the training data and provide the retrieved portion to the virtual machine instance 822 training the machine learning model. Once the virtual machine instance 822 has applied and used the retrieved portion or once the virtual machine instance 822 is about to use all of the retrieved portion (for example, a buffer storing the retrieved portion is nearly empty), then the model training system 808 can retrieve a second portion of the training data and provide the second retrieved portion to the virtual machine instance 822, and so on.

To perform the machine learning model training, the virtual machine instance 822 executes code 837 stored in the ML training container 830 in some examples. For example, the code 837 includes some or all of the executable instructions that form the container image of the ML training container 830 initialized therein. Thus, the virtual machine instance 822 executes some or all of the executable instructions that form the container image of the ML training container 830 initialized therein to train a machine learning model. The virtual machine instance 822 executes some or all of the executable instructions according to the hyperparameter values included in the training request. As an illustrative example, the virtual machine instance 822 trains a machine learning model by identifying values for certain parameters (for example, coefficients, weights, centroids, etc.). The identified values depend on hyperparameters that define how the training is performed. Thus, the virtual machine instance 822 can execute the executable instructions to initiate a machine learning model training process, where the training process is run using the hyperparameter values included in the training request. Execution of the executable instructions can include the virtual machine instance 822 applying the training data retrieved by the model training system 808 as input parameters to some or all of the instructions being executed.

In some examples, executing the executable instructions causes the virtual machine instance 822 (for example, the ML training container 830) to generate model data. For example, the ML training container 830 generates model data and stores the model data in a file system of the ML training container 830. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some examples, executing the executable instructions causes a modification to the ML training container 830 such that the model data is written to the top container layer of the ML training container 830 and/or the container image(s) that forms a portion of the ML training container 830 is modified to include the model data.

The virtual machine instance 822 (or the model training system 808 itself) pulls the generated model data from the ML training container 830 and stores the generated model data in the training model data store 875 in an entry associated with the virtual machine instance 822 and/or the machine learning model being trained. In some examples, the virtual machine instance 822 generates a single file that includes model data and stores the single file in the training model data store 875. In some examples, the virtual machine instance 822 generates multiple files during the course of training a machine learning model, where each file includes model data. In some examples, each model data file includes the same or different model data information (for example, one file identifies the structure of an algorithm, another file includes a list of coefficients, etc.). The virtual machine instance 822 can package the multiple files into a single file once training is complete and store the single file in the training model data store 875. Alternatively, the virtual machine instance 822 stores the multiple files in the training model data store 875. The virtual machine instance 822 stores the file(s) in the training model data store 875 while the training process is ongoing and/or after the training process is complete.

In some examples, the virtual machine instance 822 regularly stores model data file(s) in the training model data store 875 as the training process is ongoing. Thus, model data file(s) can be stored in the training model data store 875 at different times during the training process. Each set of model data files corresponding to a particular time or each set of model data files present in the training model data store 875 as of a particular time could be checkpoints that represent different versions of a partially-trained machine learning model during different stages of the training process. Accordingly, before training is complete, a user, via the user device 802 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 875.

In some examples, a virtual machine instance 822 executes code 837 stored in a plurality of ML training containers 830. For example, the algorithm included in the container image can be in a format that allows for the parallelization of the training process. Thus, the model training system 808 can create multiple copies of the container image provided in a training request and cause the virtual machine instance 822 to load each container image copy in a separate ML training container 830. The virtual machine instance 822 can then execute, in parallel, the code 837 stored in the ML training containers 830. The virtual machine instance 822 can further provide configuration information to each ML training container 830 (for example, information indicating that N ML training containers 830 are collectively training a machine learning model and that a particular ML training container 830 receiving the configuration information is ML training container 830 number X of N), which can be included in the resulting model data. By parallelizing the training process, the model training system 808 can significantly reduce the training time in some examples.

In some examples, a plurality of virtual machine instances 822 execute code 837 stored in a plurality of ML training containers 830. For example, the resources used to train a particular machine learning model can exceed the limitations of a single virtual machine instance 822. However, the algorithm included in the container image can be in a format that allows for the parallelization of the training process. Thus, the model training system 808 can create multiple copies of the container image provided in a training request, initialize multiple virtual machine instances 822, and cause each virtual machine instance 822 to load a container image copy in one or more separate ML training containers 830. The virtual machine instances 822 can then each execute the code 837 stored in the ML training containers 830 in parallel. The model training system 808 can further provide configuration information to each ML training container 830 via the virtual machine instances 822 (for example, information indicating that N ML training containers 830 are collectively training a machine learning model and that a particular ML training container 830 receiving the configuration information is ML training container 830 number X of N, information indicating that M virtual machine instances 822 are collectively training a machine learning model and that a particular ML training container 830 receiving the configuration information is initialized in virtual machine instance 822 number Y of M, etc.), which can be included in the resulting model data. As described above, by parallelizing the training process, the model training system 808 can significantly reduce the training time in some examples.

In some examples, the model training system 808 includes a plurality of physical computing devices and two or more of the physical computing devices hosts one or more virtual machine instances 822 that execute the code 837. Thus, the parallelization can occur over different physical computing devices in addition to over different virtual machine instances 822 and/or ML training containers 830.

In some examples, the model training system 808 includes a ML model evaluator 828. The ML model evaluator 828 can monitor virtual machine instances 822 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 828 can obtain the model data for a machine learning model being trained and evaluation data from the training data store 860. The evaluation data is separate from the data used to train a machine learning model and includes both input data and expected outputs (for example, known results), and thus the ML model evaluator 828 can define a machine learning model using the model data and execute the machine learning model by providing the input data as inputs to the machine learning model. The ML model evaluator 828 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 828 periodically generates model metrics during the training process and stores the model metrics in the training metrics data store 865 in some examples. While the machine learning model is being trained, a user, via the user device 802, can access and retrieve the model metrics from the training metrics data store 865. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some examples, the user, via the user device 802, can transmit a request to the model training system 808 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 808 can modify the machine learning model accordingly. For example, the model training system 808 can cause the virtual machine instance 822 to optionally delete an existing ML training container 830, create and initialize a new ML training container 830 using some or all of the information included in the request, and execute the code 837 stored in the new ML training container 830 to restart the machine learning model training process. As another example, the model training system 808 can cause the virtual machine instance 822 to modify the execution of code stored in an existing ML training container 830 according to the data provided in the modification request. In some examples, the user, via the user device 802, can transmit a request to the model training system 808 to stop the machine learning model training process. The model training system 808 can then instruct the virtual machine instance 822 to delete the ML training container 830 and/or to delete any model data stored in the training model data store 875.

As described below, in some examples, the model data stored in the training model data store 875 is used by the model hosting system 810 to deploy machine learning models. Alternatively or additionally, a user device 802 or another computing device (not shown) can retrieve the model data from the training model data store 875 to implement a learning algorithm in an external device. As an illustrative example, a robotic device can include sensors to capture input data. A user device 802 can retrieve the model data from the training model data store 875 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 822 are shown in FIG. 8 as a single grouping of virtual machine instances 822, some examples of the present application separate virtual machine instances 822 that are actively assigned to execute tasks from those virtual machine instances 822 that are not actively assigned to execute tasks. For example, those virtual machine instances 822 actively assigned to execute tasks are grouped into an "active pool," while those virtual machine instances 822 not actively assigned to execute tasks are placed within a "warming pool." In some examples, those virtual machine instances 822 within the warming pool can be pre-initialized with an operating system, language runtimes, and/or other software required to enable rapid execution of tasks (for example, rapid initialization of machine learning model training in ML training container(s) 830) in response to training requests.

In some examples, the model training system 808 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model hosting system 810, etc.). The processing unit can also communicate to and from a memory of a virtual machine instance 822 and further provide output information for an optional display via the input/output device interface. The input/output device interface can also accept input from an optional input device. The memory can contain computer program instructions (grouped as modules in some examples) that the processing unit executes in order to implement one or more aspects of the present disclosure.

In some examples, the model hosting system 810 includes a single physical computing device or multiple physical computing devices that are interconnected using one or more computing networks (not shown), where the physical computing device(s) host one or more virtual machine instances 842. The model hosting system 810 can handle the acquisition and configuration of compute capacity (for example, containers, instances, etc.) based on demand for the execution of trained machine learning models. The model hosting system 810 can then execute machine learning models using the compute capacity, as is described in greater detail below. The model hosting system 810 can automatically scale up and down based on the volume of execution requests received from user devices 802 via frontend 849 of the model hosting system 810, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some examples, the virtual machine instances 842 are used to execute tasks. For example, such tasks can include executing a machine learning model. As shown in FIG. 8, each virtual machine instance 842 includes an operating system (OS) 844, a language runtime 846, and one or more ML scoring containers 850. The ML scoring containers 850 are similar to the ML training containers 830 in that the ML scoring containers 850 are logical units created within a virtual machine instance using the resources available on that instance and can be used to isolate execution of a task from other processes (for example, task executions) occurring in the instance. In some examples, the ML scoring containers 850 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 850 (for example, creation of new files, modification of existing files, deletion of files, etc.) are stored in the top container layer. If a ML scoring container 850 is deleted, the top container layer is also deleted. However, the container image(s) that form a portion of the deleted ML scoring container 850 can remain unchanged. The ML scoring containers 850 can be implemented, for example, as Linux containers.

The ML scoring containers 850 each include a runtime 854, code 856, and dependencies 852 (for example, supporting software such as libraries) needed by the code 856 in some examples. The runtime 854 can be defined by one or more executable instructions that form at least a portion of a container image that is used to form the ML scoring container 850 (for example, the executable instruction(s) in the container image that define the operating system and/or runtime to run in the container formed from the container image). The code 856 includes one or more executable instructions that form at least a portion of a container image that is used to form the ML scoring container 850. For example, the code 856 includes the executable instructions in the container image that represent an algorithm that defines a machine learning model, which may reference dependencies 852. The code 856 can also include model data that represent characteristics of the defined machine learning model, as described in greater detail below. The runtime 854 is configured to execute the code 856 in response to an instruction to begin execution of a machine learning model. Execution of the code 856 results in the generation of outputs (for example, predicted results), as described in greater detail below.

In some examples, the runtime 854 is the same as the runtime 846 used by the virtual machine instance 842. In some examples, runtime 854 is different than the runtime 846 used by the virtual machine instance 842.

In some examples, the model hosting system 810 uses one or more container images included in a deployment request (or a container image retrieved from the container data store 870 in response to a received deployment request) to create and initialize a ML scoring container 850 in a virtual machine instance 842. For example, the model hosting system 810 creates an ML scoring container 850 that includes the container image(s) and/or a top container layer.

As described above, a user device 802 can submit a deployment request and/or an execution request to the model hosting system 810 via the frontend 849 in some examples. A deployment request causes the model hosting system 810 to deploy a trained machine learning model into a virtual machine instance 842. For example, the deployment request can include an identification of an endpoint (for example, an endpoint name, such as an HTTP endpoint name) and an identification of one or more trained machine learning models (for example, a location of one or more model data files stored in the training model data store 875). Optionally, the deployment request also includes an identification of one or more container images stored in the container data store 870.

Upon receiving the deployment request, the model hosting system 810 initializes one or more ML scoring containers 850 in one or more hosted virtual machine instance 842. In examples in which the deployment request includes an identification of one or more container images, the model hosting system 810 forms the ML scoring container(s) 850 from the identified container image(s). For example, a container image identified in a deployment request can be the same container image used to form an ML training container 830 used to train the machine learning model corresponding to the deployment request. Thus, the code 856 of the ML scoring container(s) 850 includes one or more executable instructions in the container image(s) that represent an algorithm that defines a machine learning model. In examples in which the deployment request does not include an identification of a container image, the model hosting system 810 forms the ML scoring container(s) 850 from one or more container images stored in the container data store 870 that are appropriate for executing the identified trained machine learning model(s). For example, an appropriate container image can be a container image that includes executable instructions that represent an algorithm that defines the identified trained machine learning model(s).

The model hosting system 810 further forms the ML scoring container(s) 850 by retrieving model data corresponding to the identified trained machine learning model(s) in some examples. For example, the deployment request can identify a location of model data file(s) stored in the training model data store 875. In examples in which a single model data file is identified in the deployment request, the model hosting system 810 retrieves the identified model data file from the training model data store 875 and inserts the model data file into a single ML scoring container 850, which forms a portion of code 856. In some examples, the model data file is archived or compressed (for example, formed from a package of individual files). Thus, the model hosting system 810 unarchives or decompresses the model data file to obtain multiple individual files and inserts the individual files into the ML scoring container 850. In some examples, the model hosting system 810 stores the model data file in the same location as the location in which the model data file was stored in the ML training container 830 that generated the model data file. For example, the model data file initially was stored in the top container layer of the ML training container 830 at a certain offset, and the model hosting system 810 then stores the model data file in the top container layer of the ML scoring container 850 at the same offset.

In examples in which multiple model data files are identified in the deployment request, the model hosting system 810 retrieves the identified model data files from the training model data store 875. The model hosting system 810 can insert the model data files into the same ML scoring container 850, into different ML scoring containers 850 initialized in the same virtual machine instance 842, or into different ML scoring containers 850 initialized in different virtual machine instances 842. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some examples, the model hosting system 810 associates the initialized ML scoring container(s) 850 with the endpoint identified in the deployment request. For example, each of the initialized ML scoring container(s) 850 can be associated with a network address. The model hosting system 810 can map the network address(es) to the identified endpoint, and the model hosting system 810 or another system (for example, a routing system, not shown) can store the mapping. Thus, a user device 802 can refer to trained machine learning model(s) stored in the ML scoring container(s) 850 using the endpoint. This allows for the network address of an ML scoring container 850 to change without causing the user operating the user device 802 to change the way in which the user refers to a trained machine learning model.

Once the ML scoring container(s) 850 are initialized, the ML scoring container(s) 850 are ready to execute trained machine learning model(s). In some examples, the user device 802 transmits an execution request to the model hosting system 810 via the frontend 849, where the execution request identifies an endpoint and includes an input to a machine learning model (for example, a set of input data). The model hosting system 810 or another system (for example, a routing system, not shown) can obtain the execution request, identify the ML scoring container(s) 850 corresponding to the identified endpoint, and route the input to the identified ML scoring container(s) 850.

In some examples, a virtual machine instance 842 executes the code 856 stored in an identified ML scoring container 850 in response to the model hosting system 810 receiving the execution request. In particular, execution of the code 856 causes the executable instructions in the code 856 corresponding to the algorithm to read the model data file stored in the ML scoring container 850, use the input included in the execution request as an input parameter, and generate a corresponding output. As an illustrative example, the algorithm can include coefficients, weights, layers, cluster centroids, and/or the like. The executable instructions in the code 856 corresponding to the algorithm can read the model data file to determine values for the coefficients, weights, layers, cluster centroids, and/or the like. The executable instructions can include input parameters, and the input included in the execution request can be supplied by the virtual machine instance 842 as the input parameters. With the machine learning model characteristics and the input parameters provided, execution of the executable instructions by the virtual machine instance 842 can be completed, resulting in an output.

In some examples, the virtual machine instance 842 stores the output in the model prediction data store 880. Alternatively or in addition, the virtual machine instance 842 transmits the output to the user device 802 that submitted the execution result via the frontend 849.

In some examples, the execution request corresponds to a group of related trained machine learning models. Thus, the ML scoring container 850 can transmit the output to a second ML scoring container 850 initialized in the same virtual machine instance 842 or in a different virtual machine instance 842. The virtual machine instance 842 that initialized the second ML scoring container 850 can then execute second code 856 stored in the second ML scoring container 850, providing the received output as an input parameter to the executable instructions in the second code 856. The second ML scoring container 850 further includes a model data file stored therein, which is read by the executable instructions in the second code 856 to determine values for the characteristics defining the machine learning model. Execution of the second code 856 results in a second output. The virtual machine instance 842 that initialized the second ML scoring container 850 can then transmit the second output to the model prediction data store 880 and/or the user device 802 via the frontend 849 (for example, if no more trained machine learning models are needed to generate an output) or transmit the second output to a third ML scoring container 850 initialized in the same or different virtual machine instance 842 (for example, if outputs from one or more additional trained machine learning models are needed), and the above-referenced process can be repeated with respect to the third ML scoring container 850.

While the virtual machine instances 842 are shown in FIG. 8 as a single grouping of virtual machine instances 842, some examples of the present application separate virtual machine instances 842 that are actively assigned to execute tasks from those virtual machine instances 842 that are not actively assigned to execute tasks. For example, those virtual machine instances 842 actively assigned to execute tasks are grouped into an "active pool," while those virtual machine instances 842 not actively assigned to execute tasks are placed within a "warming pool." In some examples, those virtual machine instances 842 within the warming pool can be pre-initialized with an operating system, language runtimes, and/or other software required to enable rapid execution of tasks (for example, rapid initialization of ML scoring container(s) 850, rapid execution of code 856 in ML scoring container(s), etc.) in response to deployment and/or execution requests.

In some examples, the model hosting system 810 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model training system 808, etc.). The processing unit can also communicate to and from a memory of a virtual machine instance 842 and further provide output information for an optional display via the input/output device interface. The input/output device interface can also accept input from an optional input device. The memory can contain computer program instructions (grouped as modules in some examples) that the processing unit executes in order to implement one or more aspects of the present disclosure.

In some examples, the operating environment supports many different types of machine learning models, such as multi arm bandit models, reinforcement learning models, ensemble machine learning models, deep learning models, and/or the like.

The model training system 808 and the model hosting system 810 depicted in FIG. 8 are not meant to be limiting. For example, the model training system 808 and/or the model hosting system 810 could also operate within a computing environment having a fewer or greater number of devices than are illustrated in FIG. 8. Thus, the depiction of the model training system 808 and/or the model hosting system 810 in FIG. 8 may be taken as illustrative and not limiting to the present disclosure. For example, the model training system 808 and/or the model hosting system 810 or various constituents thereof could implement various web services components, hosted or "cloud" computing environments, and/or peer-to-peer network configurations to implement at least a portion of the processes described herein. In some examples, the model training system 808 and/or the model hosting system 810 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 829 processes all training requests received from user devices 802 and provisions virtual machine instances 822. In some examples, the frontend 829 serves as a front door to all the other services provided by the model training system 808. The frontend 829 processes the requests and makes sure that the requests are properly authorized. For example, the frontend 829 may determine whether the user associated with the training request is authorized to initiate the training process.

Similarly, frontend 849 processes all deployment and execution requests received from user devices 802 and provisions virtual machine instances 842. In some examples, the frontend 849 serves as a front door to all the other services provided by the model hosting system 810. The frontend 849 processes the requests and makes sure that the requests are properly authorized. For example, the frontend 849 may determine whether the user associated with a deployment request or an execution request is authorized to access the indicated model data and/or to execute the indicated machine learning model.

The training data store 860 stores training data and/or evaluation data. The training data can be data used to train machine learning models and evaluation data can be data used to evaluate the performance of machine learning models. In some examples, the training data and the evaluation data have common data. In some examples, the training data and the evaluation data do not have common data. In some examples, the training data includes input data and expected outputs. While the training data store 860 is depicted as being located external to the model training system 808 and the model hosting system 810, this is not meant to be limiting. For example, in some examples not shown, the training data store 860 is located internal to at least one of the model training system 808 or the model hosting system 810.

In some examples, the training metrics data store 865 stores model metrics. While the training metrics data store 865 is depicted as being located external to the model training system 808 and the model hosting system 810, this is not meant to be limiting. For example, in some examples not shown, the training metrics data store 865 is located internal to at least one of the model training system 808 or the model hosting system 810.

The container data store 870 stores container images, such as container images used to form ML training containers 830 and/or ML scoring containers 850, that can be retrieved by various virtual machine instances 822 and/or 842. While the container data store 870 is depicted as being located external to the model training system 808 and the model hosting system 810, this is not meant to be limiting. For example, in some examples not shown, the container data store 870 is located internal to at least one of the model training system 808 and the model hosting system 810.

The training model data store 875 stores model data files. In some examples, some of the model data files are comprised of a single file, while other model data files are packages of multiple individual files. While the training model data store 875 is depicted as being located external to the model training system 808 and the model hosting system 810, this is not meant to be limiting. For example, in some examples not shown, the training model data store 875 is located internal to at least one of the model training system 808 or the model hosting system 810.

The model prediction data store 880 stores outputs (for example, execution results) generated by the ML scoring containers 850 in some examples. While the model prediction data store 880 is depicted as being located external to the model training system 808 and the model hosting system 810, this is not meant to be limiting. For example, in some examples not shown, the model prediction data store 880 is located internal to at least one of the model training system 808 and the model hosting system 810.

While the model training system 808, the model hosting system 810, the training data store 860, the training metrics data store 865, the container data store 870, the training model data store 875, and the model prediction data store 880 are illustrated as separate components, this is not meant to be limiting. In some examples, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 802 via the one or more network(s) 106.

Various example user devices 802 are shown in FIG. 8, including a desktop computer, laptop, and a mobile phone, each provided by way of illustration. In general, the user devices 802 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some examples, the model training system 808 and/or the model hosting system 810 provides the user devices 802 with one or more user interfaces, command-line interfaces (CLI), application programing interfaces (API), and/or other programmatic interfaces for submitting training requests, deployment requests, and/or execution requests. In some examples, the user devices 802 can execute a stand-alone application that interacts with the model training system 808 and/or the model hosting system 810 for submitting training requests, deployment requests, and/or execution requests.

In some examples, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some examples, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 9:
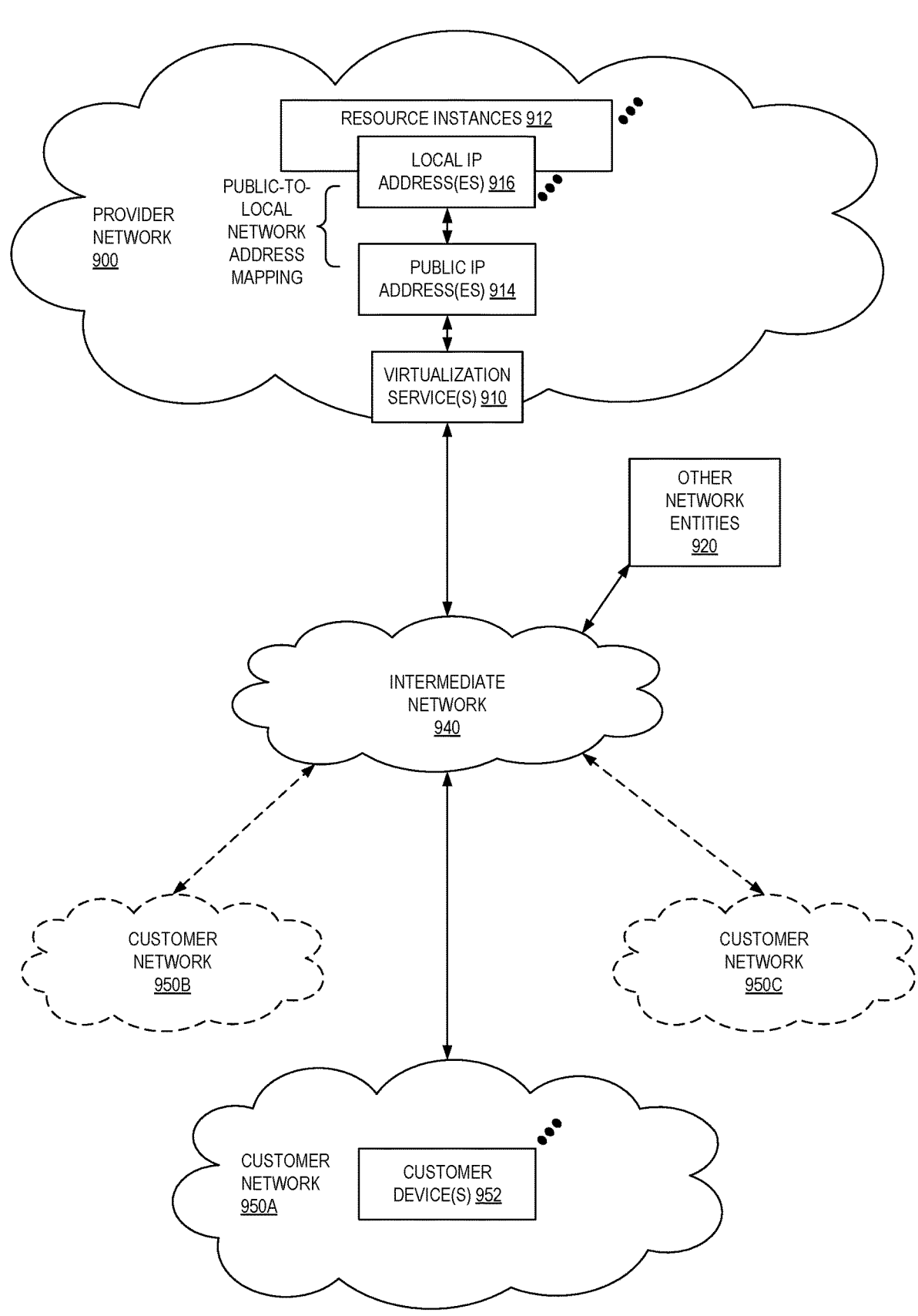
FIG. 9 illustrates an example provider network environment according to some examples.

FIG. 9 illustrates an example provider network environment according to some examples. A provider network 900 can provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 can be associated with the resource instances 912; the local IP addresses are the internal network addresses of the resource instances 912 on the provider network 900. In some examples, the provider network 900 can also provide public IP addresses 914 and/or public IP address ranges (e.g., Internet Protocol version 4 (IPv4) or Internet Protocol version 6 (IPv6) addresses) that customers can obtain from the provider 900.

Conventionally, the provider network 900, via the virtualization services 910, can allow a customer of the service provider (e.g., a customer that operates one or more customer networks 950A-950C (or "client networks") including one or more customer device(s) 952) to dynamically associate at least some public IP addresses 914 assigned or allocated to the customer with particular resource instances 912 assigned to the customer. The provider network 900 can also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of the customer network(s) 950A-950C can, for example, implement customer-specific applications and present the customer's applications on an intermediate network 940, such as the Internet. Other network entities 920 on the intermediate network 940 can then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 can be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 900; a customer can then assign their allocated public IP addresses to particular resource instances allocated to the customer. These public IP addresses can be referred to as customer public IP addresses, or simply customer IP addresses. Instead of being assigned by the provider network 900 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
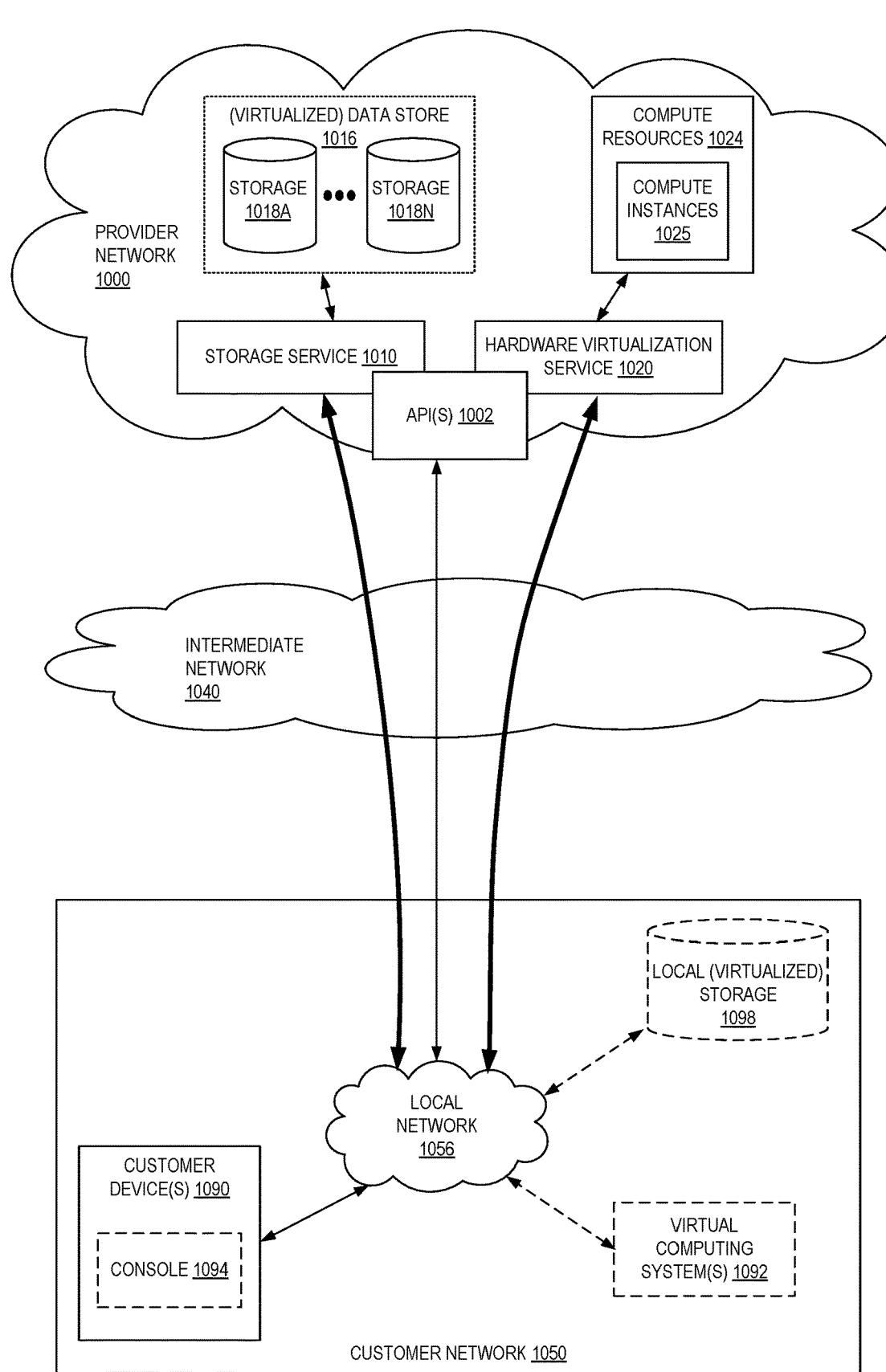
FIG. 10 illustrates an example provider network that provides a storage service and a hardware virtualization service to customers according to some examples.

FIG. 10 illustrates an example provider network that provides a storage service and a hardware virtualization service to customers according to some examples. A hardware virtualization service 1020 provides multiple compute resources 1024 (e.g., compute instances 1025, such as VMs) to customers. The compute resources 1024 can, for example, be provided as a service to customers of a provider network 1000 (e.g., to a customer that implements a customer network 1050). Each computation resource 1024 can be provided with one or more local IP addresses. The provider network 1000 can be configured to route packets from the local IP addresses of the compute resources 1024 to public Internet destinations, and from public Internet sources to the local IP addresses of the compute resources 1024.

The provider network 1000 can provide the customer network 1050, for example coupled to an intermediate network 1040 via a local network 1056, the ability to implement virtual computing systems 1092 via the hardware virtualization service 1020 coupled to the intermediate network 1040 and to the provider network 1000. In some examples, the hardware virtualization service 1020 can provide one or more APIs 1002, for example a web services interface, via which the customer network 1050 can access functionality provided by the hardware virtualization service 1020, for example via a console 1094 (e.g., a web-based application, standalone application, mobile application, etc.) of a customer device 1090. In some examples, at the provider network 1000, each virtual computing system 1092 at the customer network 1050 can correspond to a computation resource 1024 that is leased, rented, or otherwise provided to the customer network 1050.

From an instance of the virtual computing system(s) 1092 and/or another customer device 1090 (e.g., via console 1094), the customer can access the functionality of a storage service 1010, for example via the one or more APIs 1002, to access data from and store data to storage resources 1018A-1018N of a virtual data store 1016 (e.g., a folder or "bucket," a virtualized volume, a database, etc.) provided by the provider network 1000. In some examples, a virtualized data store gateway (not shown) can be provided at the customer network 1050 that can locally cache at least some data, for example frequently accessed or critical data, and that can communicate with the storage service 1010 via one or more communications channels to upload new or modified data from a local cache so that the primary store of data (the virtualized data store 1016) is maintained. In some examples, a user, via the virtual computing system 1092 and/or another customer device 1090, can mount and access virtual data store 1016 volumes via the storage service 1010 acting as a storage virtualization service, and these volumes can appear to the user as local (virtualized) storage 1098.

While not shown in FIG. 10, the virtualization service(s) can also be accessed from resource instances within the provider network 1000 via the API(s) 1002. For example, a customer, appliance service provider, or other entity can access a virtualization service from within a respective virtual network on the provider network 1000 via the API(s) 1002 to request allocation of one or more resource instances within the virtual network or within another virtual network.

Figure 11:
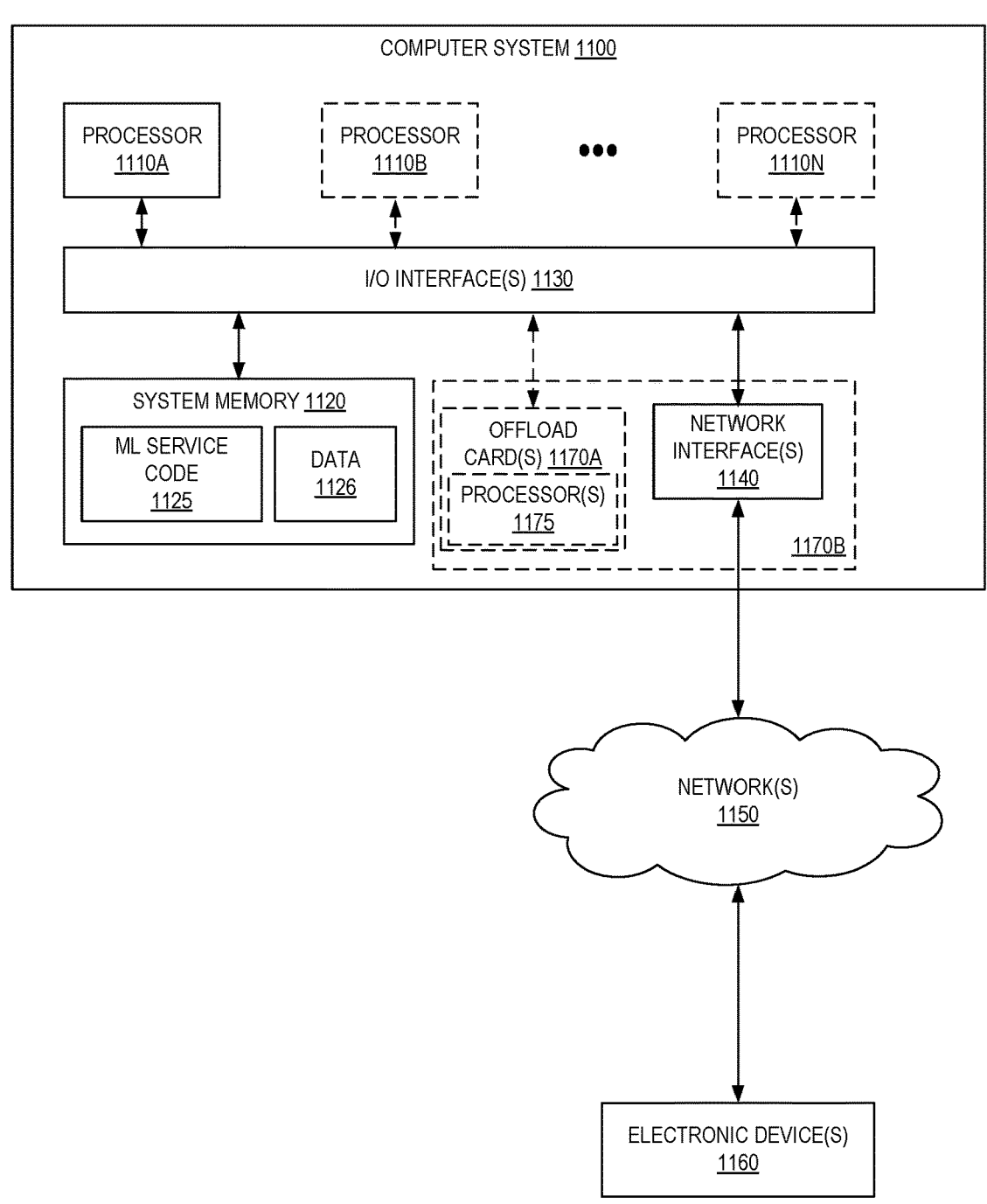
FIG. 11 illustrates an example computer system that can be used in some examples.

FIG. 11 illustrates an example computer system that can be used in some examples. In some examples, a system that implements a portion or all of the techniques described herein can include a general-purpose computer system, such as the computer system 1100 illustrated in FIG. 11, that includes, or is configured to access, one or more computer-accessible media. In the illustrated example, the computer system 1100 includes one or more processors 1110A-1110N coupled to a system memory 1120 via an input/output (I/O) interface 1130. The computer system 1100 further includes a network interface 1140 coupled to the I/O interface 1130. While FIG. 11 shows the computer system 1100 as a single computing device, in various examples the computer system 1100 can include one computing device or any number of computing devices configured to work together as a single computer system 1100.

In various examples, the computer system 1100 can be a uniprocessor system including one processor 1110, or a multiprocessor system including several processors 1110 (e.g., two, four, eight, or another suitable number). The processor(s) 1110 can be any suitable processor(s) capable of executing instructions. For example, in various examples, the processor(s) 1110 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1110 can commonly, but not necessarily, implement the same ISA.

The system memory 1120 can store instructions and data accessible by the processor(s) 1110. In various examples, the system memory 1120 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1120 as machine learning service code 1125 (e.g., executable to implement, in whole or in part, the machine learning service 102) and data 1126.

In some examples, the I/O interface 1130 can be configured to coordinate I/O traffic between the processor 1110, the system memory 1120, and any peripheral devices in the device, including the network interface 1140 and/or other peripheral interfaces (not shown). In some examples, the I/O interface 1130 can perform any necessary protocol, timing, or other data transformations to convert data signals from one component (e.g., the system memory 1120) into a format suitable for use by another component (e.g., the processor 1110). In some examples, the I/O interface 1130 can include support for devices attached through various types of peripheral buses, such as a variant of the Peripheral Component Interconnect (PCI) bus standard or the Universal Serial Bus (USB) standard, for example. In some examples, the function of the I/O interface 1130 can be split into two or more separate components, such as a north bridge and a south bridge, for example. Also, in some examples, some or all of the functionality of the I/O interface 1130, such as an interface to the system memory 1120, can be incorporated directly into the processor 1110.

The network interface 1140 can be configured to allow data to be exchanged between the computer system 1100 and other devices 1160 attached to a network or networks 1150, such as other computer systems or devices as illustrated in FIG. 1, for example. In various examples, the network interface 1140 can support communication via any suitable wired or wireless general data networks, such as types of Ethernet network, for example. Additionally, the network interface 1140 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1100 includes one or more offload cards 1170A or 1170B (including one or more processors 1175, and possibly including the one or more network interfaces 1140) that are connected using the I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1100 can act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some examples the offload card(s) 1170A or 1170B can perform compute instance management operations, such as pausing and/or un-pausing compute instances, launching and/or terminating compute instances, performing memory transfer/copying operations, etc. These management operations can, in some examples, be performed by the offload card(s) 1170A or 1170B in coordination with a hypervisor (e.g., upon a request from a hypervisor) that is executed by the other processors 1110A-1110N of the computer system 1100. However, in some examples the virtualization manager implemented by the offload card(s) 1170A or 1170B can accommodate requests from other entities (e.g., from compute instances themselves), and cannot coordinate with (or service) any separate hypervisor.

In some examples, the system memory 1120 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1100 via the I/O interface 1130. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1100 as the system memory 1120 or another type of memory. Further, a computer-accessible medium can include transmission media or signals such as electrical, electromagnetic, or digital signals, conveyed via a communication medium such as a network and/or a wireless link, such as can be implemented via the network interface 1140.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1018A-1018N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
clustering words in a vocabulary into a plurality of clusters of similar sounding words using k-means clustering, wherein a number of clusters of the plurality of clusters is based on a maximum cluster size;
calculating, with a first attention neural network, a similarity score for each cluster based on a dot product of an embedding of each cluster with an audio embedding of an utterance generated with an automated speech recognition encoder neural network;
selecting a cluster from the plurality of clusters having the highest similarity score;
calculating, by an embedding encoder neural network, an embedding of a word in the selected cluster based at least in part on at least one of an audio sample of a pronunciation of the word or a phonetic representation of the word;
calculating, with a second attention neural network, a bias factor based on a similarity between the embedding of the word and the audio embedding of the utterance;
biasing the audio embedding of the utterance by the bias factor to generate a biased audio embedding of the utterance; and
generating, by a machine learning service based at least in part on the biased audio embedding of the utterance, a text prediction of the utterance.

2. The computer-implemented method of claim 1, wherein generating the text prediction of the utterance comprises processing the biased audio embedding of the utterance using a linear layer or a fully-connected layer, and a softmax operation, followed by a beam search decoder to collapse the biased audio embedding of the utterance into the text prediction of the utterance.

3. The computer-implemented method of claim 1, wherein all words in the plurality of clusters of similar sounding words are part of a vocabulary identified in a request received by the machine learning service.

4. A computer-implemented method comprising:

calculating, with a first attention neural network, a score for a cluster based on a dot product of an embedding of the cluster and an audio embedding of an utterance generated with an automated speech recognition encoder neural network;

selecting the cluster from a plurality of clusters of similar sounding words based on the score, wherein the score represents a similarity between the embedding of the cluster and the audio embedding of the utterance;

calculating, with a second attention neural network, a similarity between an embedding of a word in the cluster and the audio embedding of the utterance based on a dot product of the embedding of the word and the audio embedding of the utterance, wherein the first attention neural network and the second attention neural network have the same weight parameters;

calculating a bias factor based on the similarity between the embedding of the word in the cluster and the audio embedding of the utterance;

biasing the audio embedding of the utterance by the bias factor to generate a biased audio embedding of the utterance; and generating, by a machine learning service based at least in part on the biased audio embedding of the utterance, a text prediction of the utterance.

5. The computer-implemented method of claim 4, wherein the automated speech recognition encoder neural network was trained with training data, and wherein the first attention neural network was trained using a subset of the training data, the subset of the training data based on samples in the training data including words having a frequency in the training data below a threshold.

6. The computer-implemented method of claim 4, further comprising calculating, with an embedding encoder neural network, the embedding of the word in the selected cluster that positions the embedding of the word in a multi-dimensional embedding space near other similar sounding words.

7. The computer-implemented method of claim 6, wherein the selected cluster includes a plurality of clustered words and further comprising:

calculating, with the embedding encoder neural network, an embedding of each word in the plurality of clustered words, wherein the embedding of the cluster is based on an average of each embedding of each word in the plurality of clustered words.

8. The computer-implemented method of claim 4, wherein generating the text prediction of the utterance comprises processing the biased audio embedding of the utterance using a linear layer or a fully-connected layer, and a softmax operation, followed by a beam search decoder to collapse the biased audio embedding of the utterance into the text prediction of the utterance.

9. The computer-implemented method of claim 4, wherein all words in the plurality of clusters of similar sounding words are part of a vocabulary identified in a request received by the machine learning service.

10. The computer-implemented method of claim 9, further comprising clustering the words in the vocabulary into the plurality of clusters of similar sounding words using k-means clustering, wherein a maximum number of words in each cluster is limited by a maximum cluster size.

11. The computer-implemented method of claim 4, wherein biasing the audio embedding of the utterance by the bias factor comprises at least one of adding the bias factor to the audio embedding or scaling the audio embedding by the bias factor.

12. A system comprising:

a first one or more electronic devices to implement a storage service in a multi-tenant provider network to store word cluster data including a plurality of clusters of similar sounding words and, for each cluster, an embedding of the cluster; and a second one or more electronic devices to implement a model hosting service in the multi-tenant provider network, the model hosting service including instructions that upon execution cause the model hosting service to:

retrieve the word cluster data from the storage service;

calculate, with a first attention neural network, a score for a cluster based on a dot product of an embedding of the cluster and an audio embedding of an utterance generated with an automated speech recognition encoder neural network;

select the cluster from the plurality of clusters of similar sounding words based on the score, wherein the score represents a similarity between the embedding of the cluster and the audio embedding of the utterance;

calculate, with a second attention neural network, a similarity between an embedding of a word in the cluster and the audio embedding of the utterance based on a dot product of the embedding of the word and the audio embedding of the utterance, wherein the first attention neural network and the second attention neural network have the same weight parameters;

calculate a bias factor based on the similarity between the embedding of the word in the cluster and the audio embedding of the utterance;

bias the audio embedding of the utterance by the bias factor to generate a biased audio embedding of the utterance; and generate, based at least in part on the biased audio embedding of the utterance, a text prediction of the utterance.

13. The system of claim 12, wherein the model hosting service includes further instructions that upon execution cause the model hosting service to calculate, with an embedding encoder neural network, the embedding of the word in the selected cluster that positions the embedding of the word in a multi-dimensional embedding space near other similar sounding words.

14. The system of claim 13, wherein the selected cluster includes a plurality of clustered words; and wherein the model hosting service includes further instructions that upon execution cause the model hosting service to calculate, with the embedding encoder neural network, an embedding of each word in the plurality of clustered words, wherein the embedding of the cluster is based on an average of each embedding of each word in the plurality of clustered words.

15. The system of claim 12, wherein the automated speech recognition encoder neural network was trained with training data, and wherein the first attention neural network was trained using a subset of the training data, the subset of the training data based on samples in the training data including words having a frequency in the training data below a threshold.

16. The system of claim 12, wherein generating the text prediction of the utterance comprises processing the biased audio embedding of the utterance using a linear layer or a fully-connected layer, and a softmax operation, followed by a beam search decoder to collapse the biased audio embedding of the utterance into the text prediction of the utterance.

17. The system of claim 12, wherein all words in the plurality of clusters of similar sounding words are part of a vocabulary identified in a request received by the machine learning service.

18. The system of claim 17, wherein the model hosting service includes further instructions that upon execution cause the model hosting service to cluster the words in the vocabulary into the plurality of clusters of similar sounding words using k-means clustering, wherein a maximum number of words in each cluster is limited by a maximum cluster size.

19. The system of claim 12, wherein biasing the audio embedding of the utterance by the bias factor comprises at least one of adding the bias factor to the audio embedding or scaling the audio embedding by the bias factor.

\* \* \* \* \*